United States Patent
Shinkai et al.

(10) Patent No.: US 9,645,711 B2
(45) Date of Patent: May 9, 2017

(54) ELECTRONIC EQUIPMENT WITH SIDE SURFACE TOUCH CONTROL OF IMAGE DISPLAY, DISPLAY CONTROL METHOD, AND NON-TRANSITORY STORAGE MEDIUM

(71) Applicant: FUJIFILM Corporation, Tokyo (JP)

(72) Inventors: Yasuhiro Shinkai, Tokyo (JP); Yuzo Aoshima, Tokyo (JP); Samito Nakamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 14/732,803

(22) Filed: Jun. 8, 2015

(65) Prior Publication Data

US 2015/0355797 A1 Dec. 10, 2015

(30) Foreign Application Priority Data

Jun. 9, 2014 (JP) ................................. 2014-118605

(51) Int. Cl.
*G06F 3/041* (2006.01)
*G06F 3/0483* (2013.01)
(Continued)

(52) U.S. Cl.
CPC .......... *G06F 3/0483* (2013.01); *G06F 1/1626* (2013.01); *G06F 1/1671* (2013.01);
(Continued)

(58) Field of Classification Search
CPC .. G06F 15/0291; G06F 1/1626; G06F 1/1671; G06F 2203/0339; G06F 3/0416;
(Continued)

(56) References Cited

U.S. PATENT DOCUMENTS 5,432,510 A * 7/1995 Matthews ............ H03K 17/967
341/20
6,229,502 B1 5/2001 Schwab
(Continued)

FOREIGN PATENT DOCUMENTS

JP 02-230313 9/1990
JP 2002-539552 11/2002
(Continued)

OTHER PUBLICATIONS

Extended European search report, dated Oct. 23, 2015; Application No. 15171122.3.
(Continued)

*Primary Examiner* — Lun-Yi Lao
*Assistant Examiner* — Kelly Hegarty
(74) *Attorney, Agent, or Firm* — Young & Thompson

(57) ABSTRACT

An electronic book reader includes a touchscreen display device disposed on a front surface of a housing. A storage medium stores image sequence information of plural images of a predetermined sequence. A contact surface portion is disposed on a side surface of the housing. A touch sensor detects contact with the contact surface portion. There is a CPU for display control of displaying the image sequence information on the touchscreen display device. An information processing device is connected between the storage medium and the CPU, for processing the image sequence information according to contact information from the touch sensor. The contact information is information of a rubbing movement in contact with the contact surface portion. The information processing device processes the image sequence information for forward or backward page turning according to a direction of the rubbing movement.

9 Claims, 19 Drawing Sheets

(51) Int. Cl.
*G06F 3/0484* (2013.01)
*G06F 1/16* (2006.01)
*G06F 15/02* (2006.01)

(52) U.S. Cl.
CPC ........ *G06F 3/0416* (2013.01); *G06F 3/04847* (2013.01); *G06F 15/0291* (2013.01); *G06F 2203/0339* (2013.01); *G09G 2370/24* (2013.01); *G09G 2380/14* (2013.01)

(58) Field of Classification Search
CPC .............. G06F 3/0483; G06F 3/04847; G09G 2370/24; G09G 2380/14
See application file for complete search history.

(56) References Cited

U.S. PATENT DOCUMENTS

| | | | | |
|---|---|---|---|---|
| 2003/0137802 | A1* | 7/2003 | Von Novak | G06F 1/1626 361/679.09 |
| 2005/0012723 | A1* | 1/2005 | Pallakoff | G06F 1/1616 345/173 |
| 2006/0017711 | A1* | 1/2006 | Pihlaja | G06F 1/1626 345/173 |
| 2006/0197750 | A1 | 9/2006 | Kerr et al. | |
| 2006/0238517 | A1* | 10/2006 | King | G06F 1/1626 345/173 |
| 2007/0168883 | A1* | 7/2007 | Sugimoto | G06F 1/1616 715/818 |
| 2011/0187660 | A1* | 8/2011 | Hirata | G06F 3/03547 345/173 |
| 2011/0209104 | A1* | 8/2011 | Hinckley | G06F 3/0416 715/863 |
| 2011/0291945 | A1* | 12/2011 | Ewing, Jr. | G06F 1/1686 345/173 |
| 2013/0093687 | A1 | 4/2013 | Papakipos et al. | |
| 2014/0225855 | A1 | 8/2014 | Aitchison | |
| 2015/0261366 | A1* | 9/2015 | Wong | G06F 1/1626 345/173 |

FOREIGN PATENT DOCUMENTS

| | | |
|---|---|---|
| JP | 2009-276961 | 11/2009 |
| JP | 2011-8767 | 1/2011 |
| JP | 2012-243204 | 12/2012 |
| JP | 2013145515 A | 7/2013 |
| JP | 2014-102594 | 6/2014 |
| WO | 2013045766 A2 | 4/2013 |

OTHER PUBLICATIONS

Japanese Official Action—2014-118605—Sep. 7, 2016.
European Office Action dated Jan. 27, 2017; Application No. 15 171 122.3.

* cited by examiner

F I G . 1
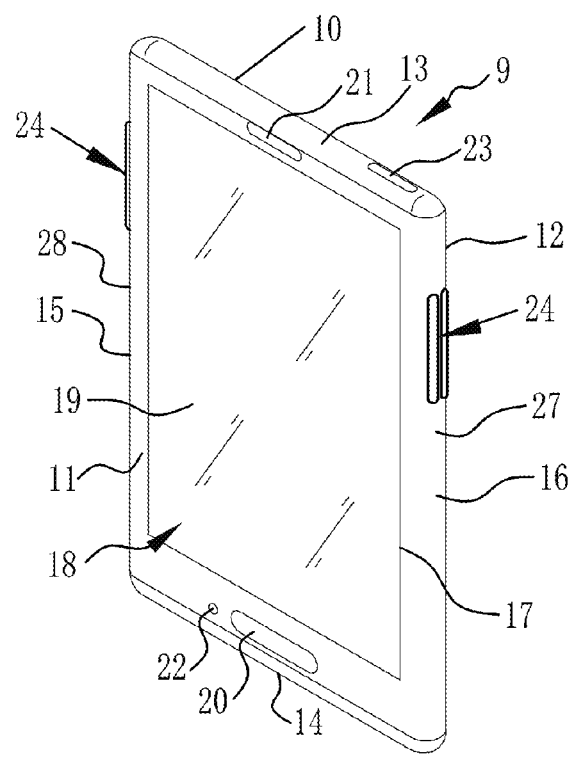
F I G . 2
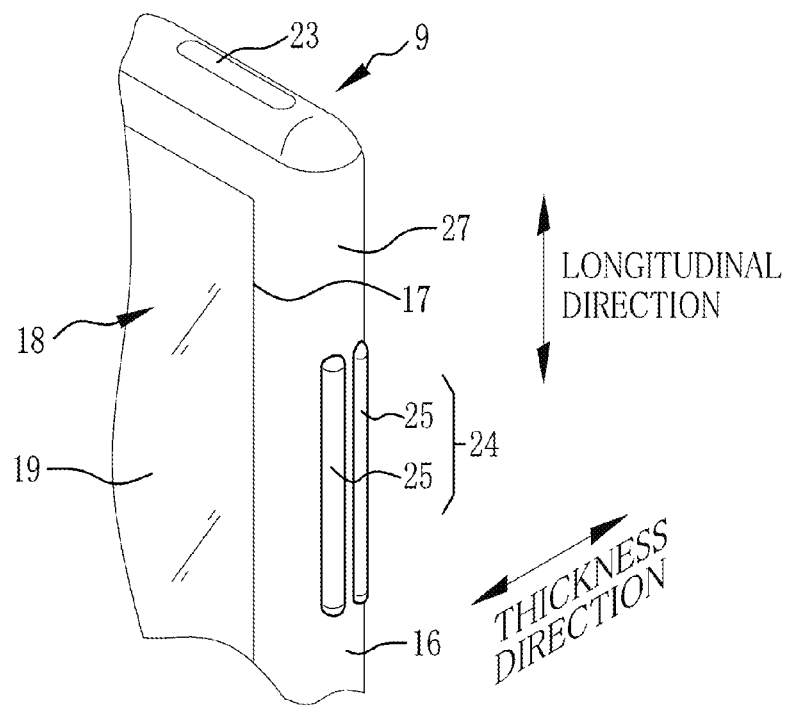

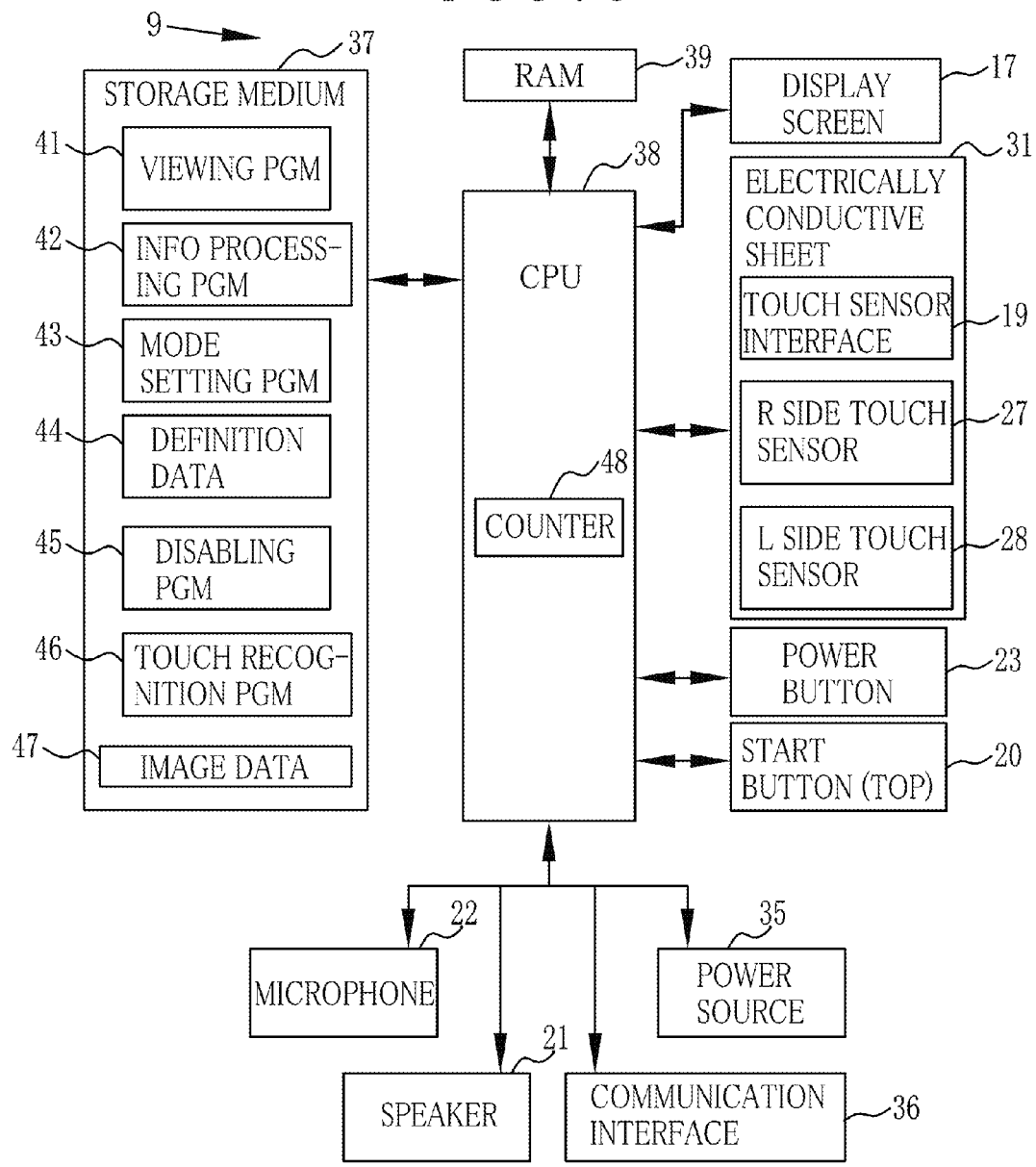

FIG. 12

| | | DISABLING | FORWARD PAGE TURNING |
|---|---|---|---|
| DIRECTION SETTING | LEFT-TO-RIGHT | L SIDE TOUCH SENSOR | RUBBING CONTACT SURFACE PORTION OF R SIDE TOUCH SENSOR IN BACK SIDE DIRECTION |
| | RIGHT-TO-LEFT | R SIDE TOUCH SENSOR | RUBBING CONTACT SURFACE PORTION OF L SIDE TOUCH SENSOR IN BACK SIDE DIRECTION |

FIG. 13

| | | DISABLING | FORWARD PAGE TURNING |
|---|---|---|---|
| DIRECTION SETTING | LEFT-TO-RIGHT | L SIDE TOUCH SENSOR | RUBBING CONTACT SURFACE PORTION OF R SIDE TOUCH SENSOR IN UPWARD DIRECTION |
| | RIGHT-TO-LEFT | R SIDE TOUCH SENSOR | RUBBING CONTACT SURFACE PORTION OF L SIDE TOUCH SENSOR IN UPWARD DIRECTION |

FIG. 16

| | DISABLING | FORWARD PAGE TURNING |
|---|---|---|
| DIRECTION SETTING — LEFT-TO-RIGHT | R SIDE TOUCH SENSOR | RUBBING CONTACT SURFACE PORTION OF L SIDE TOUCH SENSOR IN FRONT SIDE DIRECTION |
| DIRECTION SETTING — RIGHT-TO-LEFT | L SIDE TOUCH SENSOR | RUBBING CONTACT SURFACE PORTION OF R SIDE TOUCH SENSOR IN FRONT SIDE DIRECTION |

FIG. 19

| | DISABLING | FORWARD PAGE TURNING |
|---|---|---|
| DIRECTION SETTING — LEFT-TO-RIGHT | R SIDE TOUCH SENSOR | RUBBING CONTACT SURFACE PORTION OF L SIDE TOUCH SENSOR IN BACK SIDE DIRECTION |
| DIRECTION SETTING — RIGHT-TO-LEFT | L SIDE TOUCH SENSOR | RUBBING CONTACT SURFACE PORTION OF R SIDE TOUCH SENSOR IN BACK SIDE DIRECTION |

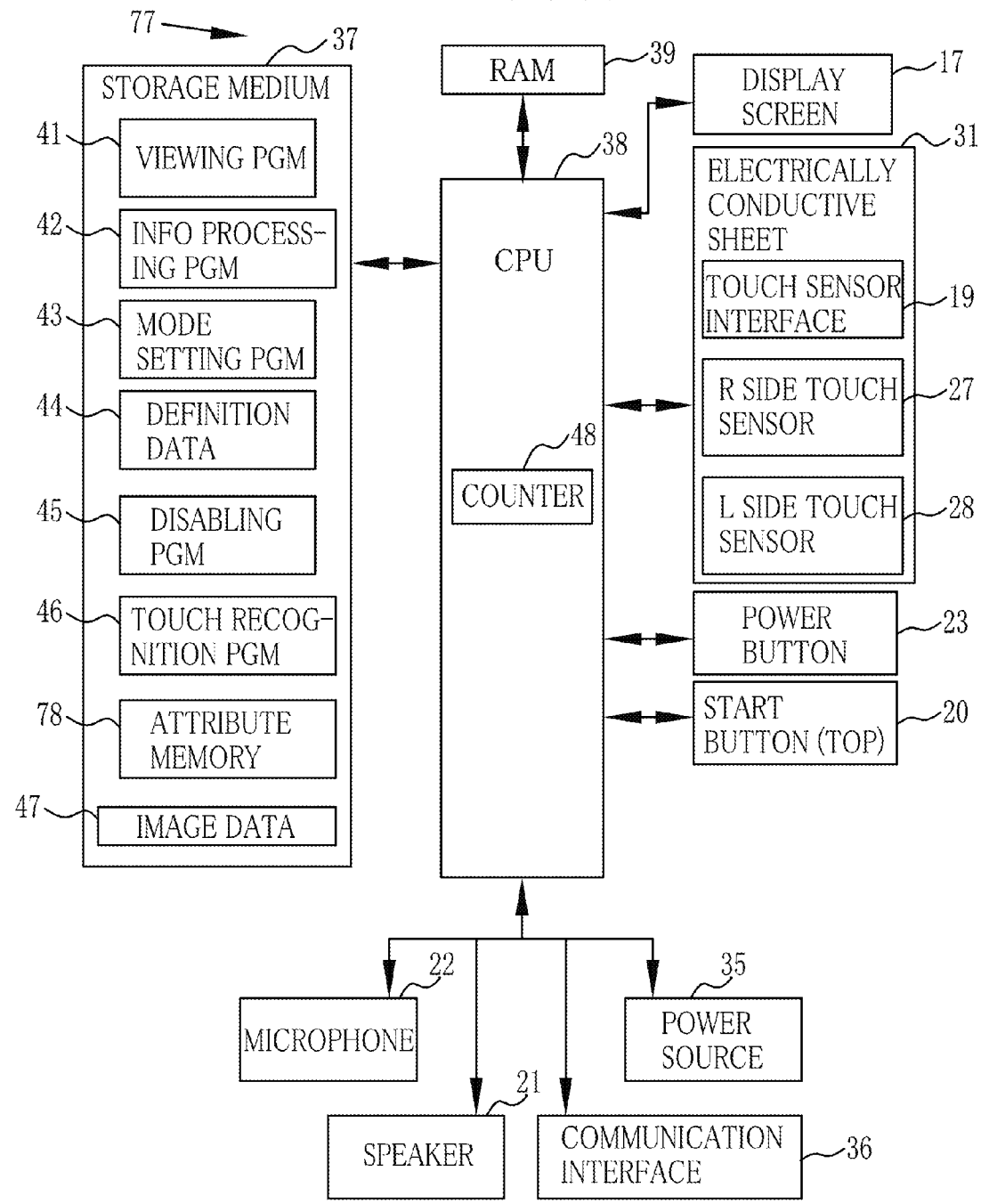

ELECTRONIC EQUIPMENT WITH SIDE SURFACE TOUCH CONTROL OF IMAGE DISPLAY, DISPLAY CONTROL METHOD, AND NON-TRANSITORY STORAGE MEDIUM

CROSS-REFERENCE TO RELATED APPLICATION

This application claims priority under 35 USC 119 from Japanese Patent Application No. 2014-118605, filed 9 Jun. 2014, the disclosure of which is incorporated by reference herein.

BACKGROUND OF THE INVENTION

1. Field of the Invention

The present invention relates to electronic equipment, display control method and storage medium. More particularly, the present invention relates to electronic equipment in which page turning of images can be performed readily with simple touch of a hand of a user, and display control method and storage medium.

2. Description Related to the Prior Art

Portable electronic equipment or image display apparatus having a touchscreen panel as a user interface is widely used. The touchscreen panel is characterized in that a display also has a function of buttons, which can be used easily in view of simple manual touch. An electronic book reader is an example of the electronic equipment, and used for reading an electronic book. An example of electronic book is a cartoon book (manga).

In general, there is a difference between left-to-right and right-to-left directions in a page turning direction of pages of a book according to languages. In books in English or other alphabetic languages, rows (lines) in a document go downwards. Pages are bound in a document feed direction of the left-to-right direction. Thus, the page turning direction is the right-to-left direction. This is the case in books written in Japanese in horizontal writing of characters.

In contrast, in books in Japanese in vertical writing of characters, columns (lines) in a document run in the right-to-left direction. Pages are bound in a document feed direction of the right-to-left direction. Thus, the page turning direction is the left-to-right direction. In the writing system of Japanese today, the vertical writing of characters is used for text in particular fields, for example, literature, law, language education, magazines and cartoons (manga). Books of cartoons are notably widespread in public.

JP-A 2-230313 discloses an electronic book reader or browsing device, in which pages can be turned easily in a manner similar to page turning of an actual book, magazine or other printed document.

However, viewer as software for viewing an electronic book is so constructed that a rubbing movement to the left is associated with page turning to next page and that a rubbing movement to the right is associated with page turning to a preceding page, irrespective of left-to-right and right-to-left directions of page turning of page information. A user is obliged to manipulate with unnatural impression differently from simple operation, because a direction of the page turning of the book of the left-to-right direction is opposite to the direction of reading.

The electronic book reader of JP-A 2-230313 has only an input device in one position. It is impossible to manipulate the electronic book reader to turn pages of images in a manner of manually turning pages of an actual book.

SUMMARY OF THE INVENTION

In view of the foregoing problems, an object of the present invention is to provide electronic equipment in which page turning of images can be performed readily with simple touch of a hand of a user, and display control method and storage medium.

In order to achieve the above and other objects and advantages of this invention, electronic equipment includes a display device disposed on a front surface of a housing. A storage medium stores image sequence information of plural images of a predetermined sequence. There is a display control unit for display control of displaying the image sequence information on the display device. A contact surface portion is disposed on at least one side surface of the housing, and tangible externally. A touch sensor detects rubbing movement in contact with the contact surface portion, to output contact information. An information processing device is connected between the storage medium and the display control unit, provided with the contact information, for processing the image sequence information according to a direction of the rubbing movement for forward or backward page turning of the plural images.

Preferably, the at least one side surface is right and left side surfaces. The touch sensor is constituted by a right side touch sensor disposed in the right side surface and a left side touch sensor disposed in the left side surface.

Preferably, furthermore, a mode setting device selects a left-to-right direction or a right-to-left direction for page turning according to the contact information from the right and left side touch sensors. A disabling device disables one of the right and left side touch sensors from detecting contact according to a selection result of the mode setting device.

Preferably, assuming that the mode setting device detects the contact information from one of the right and left side touch sensors, the disabling device disables a remaining one of the right and left side touch sensors.

In another preferred embodiment, furthermore, an attribute memory stores attribute information including page turn information of a left-to-right direction or a right-to-left direction for page turning. A disabling device disables one of the right and left side touch sensors from detecting contact according to the page turn information.

Preferably, furthermore, a lateral recess is formed in the side surface, the contact surface portion and the touch sensor being disposed at the lateral recess.

Preferably, the lateral recess is constituted by plural lateral recesses disposed for fingers of a hand to hold the housing manually.

Preferably, the side surface or the lateral recess has a curved surface portion in a thickness direction of the housing.

Preferably, the contact surface portion includes first and second contact areas. The information processing device, in case the first contact area is contacted, processes the image sequence information in a mode for displaying the images by one image, and in case the second contact area is contacted, processes the image sequence information in a mode for simultaneously displaying a plurality of images among the images.

Preferably, the right and left side touch sensors are constituted by one electrically conductive sheet in a flexible form.

Preferably, the electrically conductive sheet is formed in a shape of the front surface and the right and left side surfaces by thermal processing, and then fitted on the housing.

Also, a display control method for a display device disposed on a front surface of a housing is provided, and includes a step of inputting contact information according to a rubbing movement in contact with a contact surface portion disposed on at least one side surface of the housing, by use of a touch sensor. Image sequence information including plural images of a predetermined sequence is processed for forward or backward page turning of the images according to a direction of the rubbing movement, for display control of the display device according to the image sequence information being processed.

Preferably, the at least one side surface is right and left side surfaces. The touch sensor is constituted by a right side touch sensor disposed in the right side surface and a left side touch sensor disposed in the left side surface. Furthermore, a left-to-right direction or a right-to-left direction for page turning is selected according to the contact information from the right and left side touch sensors. One of the right and left side touch sensors is disabled from detecting contact according to a selection result of the mode setting step.

Preferably, assuming that the contact information is detected from one of the right and left side touch sensors, a remaining one of the right and left side touch sensors is disabled in the disabling step.

Also, a storage medium for storing a computer-executable program for electronic equipment is provided, the electronic equipment including a display device disposed on a front surface of a housing, and a touch sensor for detecting contact with a contact surface portion disposed on at least one side surface of the housing. The computer-executable program includes a program code for inputting contact information according to a rubbing movement in contact with the contact surface portion by use of the touch sensor. A program code is for processing image sequence information including plural images of a predetermined sequence for forward or backward page turning according to a direction of the rubbing movement, and for display control of the display device according to the image sequence information being processed.

Consequently, page turning of images can be performed readily with simple touch of a hand of a user, because a direction of a rubbing movement to a contact surface portion can be detected and considered for the page turning.

BRIEF DESCRIPTION OF THE DRAWINGS

The above objects and advantages of the present invention will become more apparent from the following detailed description when read in connection with the accompanying drawings, in which:

FIG. 1 is a perspective view illustrating an electronic book reader;

FIG. 2 is a perspective view illustrating a right side surface of the electronic book reader in enlargement;

FIG. 6 is a block diagram illustrating the electronic book reader;

FIG. 12 is a table illustrating definition of contact information according to a direction of page turning;

FIG. 13 is a table illustrating definition of contact information of a rubbing movement;

FIG. 16 is a table illustrating definition of contact information in a preferred embodiment for disabling one of touch sensors;

FIG. 19 is a table illustrating definition of other preferred contact information;

FIG. 30 is a block diagram illustrating a preferred embodiment for automatically setting page turn information.

DETAILED DESCRIPTION OF THE PREFERRED EMBODIMENT(S) OF THE PRESENT INVENTION

Figure 3:
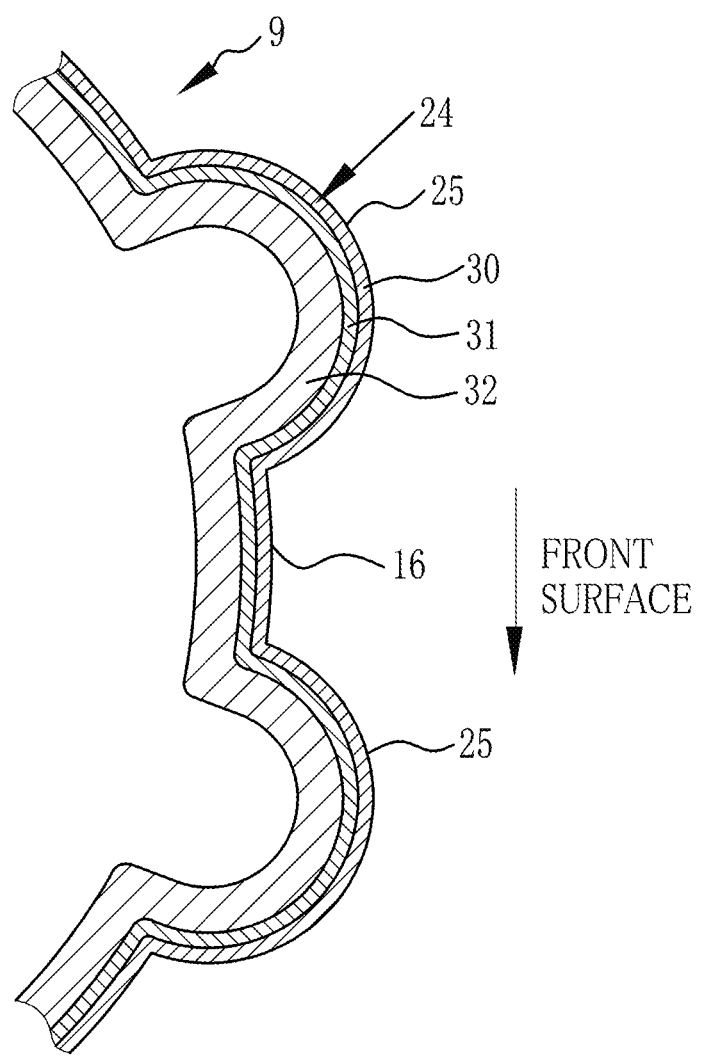
FIG. 3 is a cross section illustrating a portion of the right side surface of the electronic book reader.

In FIG. 1, an electronic book reader 9 or portable electronic equipment or image display apparatus of the invention is illustrated. The electronic book reader 9 has a function of a mobile telephone or mobile terminal equipment for communication. A housing 10 of the electronic book reader 9 has a small thickness of a box shape. The housing 10 has a front surface 11 and a rear surface 12 with larger areas than other surfaces. Four side surfaces connect the front and rear surfaces 11 and 12. The side surfaces include an upper surface 13, a lower surface 14, a left side surface 15 and a right side surface 16 as viewed in a vertical posture in the drawing. A touchscreen display device 18 is provided on the front surface 11. A display screen 17 of a quadrilateral shape is disposed in the touchscreen display device 18. In the vertical posture, longer side lines of the display screen 17 are oriented vertically.

The touchscreen display device 18 includes the display screen 17 and a touch sensor interface 19. Examples of the touch sensor interface 19 can be a resistance film type, electrostatic capacitive type, pressure sensitive type and the like. The display screen 17 displays an initial menu image or home menu image. Various icons are displayed in the initial menu image for various applications. One of the icons is tapped so as to run one of the applications linked with the tapped icon. Note that tapping is movement of one push with one finger.

The front surface 11 has a start button 20 or TOP button, a speaker 21 and a microphone 22. The start button 20 is a button for returning to an initial menu image. The speaker 21 outputs voice of a caller, and music, sound effect or other sound reproduced by a reproduction program. The microphone 22 detects voice or sound in the course of communication or receiving sound as an input signal. A power button 23 is disposed on the upper surface 13.

In FIG. 2, the right side surface 16 is illustrated in enlargement. The right side surface 16 is curved convexly outwards. A contact surface portion 24 (touch pad device) is disposed on the right side surface 16. Touch bar devices 25 (touch patterns) or projections in the contact surface portion 24 extend in a longitudinal direction of the right side surface 16, and are arranged in a thickness direction of the electronic book reader 9 or transversely with the display screen 17. Also, the left side surface 15 has the contact surface portion 24 including the touch bar devices 25 in the same manner as the right side surface 16. Note that the number of the touch bar devices 25 in the contact surface portion 24 can be one or two or more. Furthermore, slits can be provided in place of the touch bar devices 25 in the contact surface portion 24. Examples of the slits can be cutouts, grooves and the like.

A right side touch sensor 27 and a left side touch sensor 28 (touch detection devices) are disposed on respectively the right side surface 16 and the left side surface 15. The right and left side touch sensors 27 and 28 detect various types of touch of the contact surface portion 24 with a finger. Examples of the right and left side touch sensors 27 and 28 can be a resistance film type, electrostatic capacitive type, pressure sensitive type and the like. The right and left side touch sensors 27 and 28 correspond to a touch sensor of the invention.

While pages of a book are viewed in the book reader, the right and left side touch sensors 27 and 28 generate contact information in contact with the contact surface portion 24, for example, long tapping movement of touch of a finger with at least a predetermined time period, short tapping movement shorter than the long tapping movement, and rubbing movement.

In FIG. 3, the right side surface 16 of the electronic book reader 9 is viewed. A wall of the right side surface 16 has layers including a protective sheet 30, an electrically conductive sheet 31 and a housing cover 32 in an inward direction. The electrically conductive sheet 31 constitutes the right side touch sensor 27. The housing cover 32 is a portion of the housing 10. Each of the protective sheet 30 and the electrically conductive sheet 31 has elasticity (flexibility) and heat shrinkability. The left side surface 15 is structurally the same as the right side surface 16.

Figure 4:
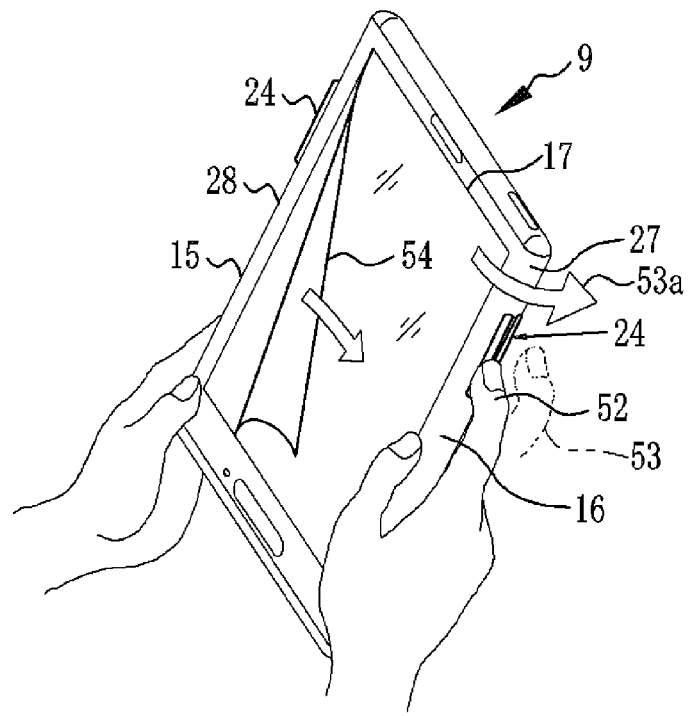
FIG. 4 is a perspective view illustrating a state of forward page turning.

In FIG. 4, a rubbing movement for page turning to next page is illustrated in the page information of the left-to-right direction of page turning. A right index finger 52 of a user or viewer performs a first rubbing movement 53 or slide movement of the contact surface portion 24 of the right side surface 16 in a rubbing direction 53a of the arrow as a back side direction, namely, away from the display screen 17. The right side touch sensor 27 detects contact information of the first rubbing movement 53. Image data 47 is processed by a CPU 38 (central processing unit) for page turning to next page. Note that a second rubbing movement is in a front side direction reverse to the rubbing direction 53a, and used for page turning to a preceding page.

Figure 5:
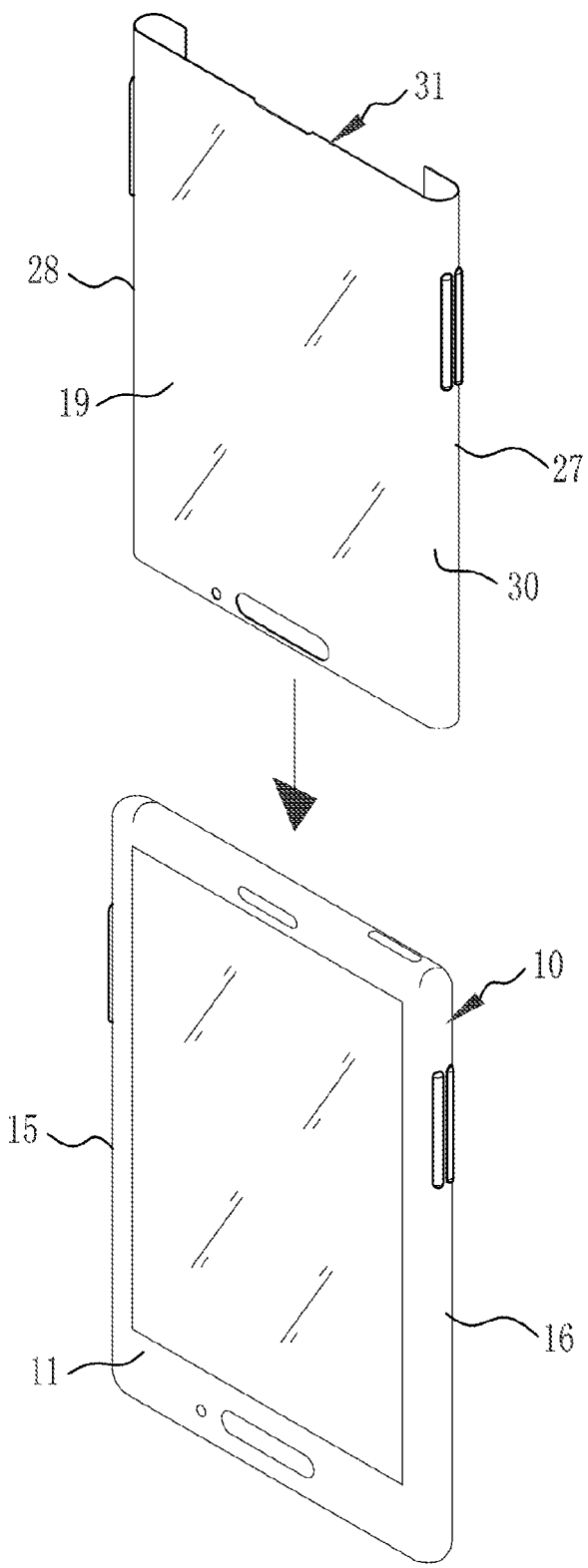
FIG. 5 is an exploded perspective view illustrating an electrically conductive sheet and a housing.

In FIG. 5, the housing 10 and the electrically conductive sheet 31 in the electronic book reader 9 are illustrated. The electrically conductive sheet 31 is a single transparent sheet of a large size to extend from the right side touch sensor 27 and the touch sensor interface 19 to the left side touch sensor 28. The electrically conductive sheet 31 includes a plurality of films with conductive patterns. At first, the protective sheet 30 is attached to an outer surface of the electrically conductive sheet 31. Then the electrically conductive sheet 31 is thermally shrunken by thermal processing in a shape similar to the housing 10, before the electrically conductive sheet 31 is attached to the housing 10 in a fitted manner. To this end, a mold in the same shape as the left side surface 15, the front surface 11 and the right side surface 16 of the housing 10 is used for the thermal processing. The mold has the shape of the housing 10 including the contact surface portion 24. The shape of the contact surface portion 24 is transferred to the electrically conductive sheet 31.

Note that the electrically conductive sheet 31 may not be the single sheet. A plurality of the electrically conductive sheets 31 can be used discretely for the right and left side surfaces 15 and 16. For this structure, an outer surface of the electrically conductive sheets 31 is provided with the protective sheet 30, before the electrically conductive sheets 31 are thermally processed in a form along the side surfaces. Then the electrically conductive sheets 31 can be attached to respectively the right and left side surfaces 15 and 16.

In FIG. 6, circuit devices in the electronic book reader 9 are illustrated. The electronic book reader 9 includes the display screen 17, the electrically conductive sheet 31, the start button 20, the power button 23, a power source 35, a communication interface 36, the speaker 21, the microphone 22, a storage medium 37, the CPU 38 or display control unit, and a RAM 39 (random access memory).

The electrically conductive sheet 31 includes the touch sensor interface 19 of the front surface 11, and the right and left side touch sensors 27 and 28. The touch sensor interface 19 detects contact information generated by touch of a finger together with position information of the display screen 17, and sends the information to the CPU 38. Examples of movement detected on the touch sensor interface 19 include tapping movement, sweeping movement and the like. Examples of the display screen 17 are a liquid crystal display device (LCD device), organic electro luminescence device (organic EL device) and the like for displaying an image or text. The display screen 17 corresponds to an information display device of the invention.

The start button 20 is a pushbutton depressible mechanically, and inputs a depression signal to the CPU 38. The right and left side touch sensors 27 and 28 detect contact information of various manners together with position information of the contact of the contact information, and input the information to the CPU 38.

The power source 35 is turned on by depression of the power button 23, and supplies various elements including the CPU 38 with power from a storage battery or external power source.

The communication interface 36 has an antenna for wirelessly transmitting and receiving signals in connection with a base station, to perform speech communication and data communication. The speaker 21 outputs sound according to a sound signal from the CPU 38. The microphone 22 converts the sound or voice of a caller into the sound signal, and inputs the sound signal to the CPU 38.

Examples of the storage medium 37 are a non-volatile memory or magnetic storage medium, for storing programs and data used in processing in the CPU 38. The programs in the storage medium 37 include a viewing program 41, an information processing program 42 for an information processing device, a mode setting program 43, a disabling program 45 for a disabling device, and a touch recognition program 46 for a touch recognition device. Also, definition data 44 and the image data 47 as electronic books are stored in the storage medium 37.

The storage medium 37 stores the program of the Operating System (OS) for basic functions of the electronic book reader 9 and application programs and data required for the communication interface 36. Also, the storage medium 37 can be constituted by a removable storage medium such as a memory card, and a reader for reading data from the removable storage medium. The storage medium 37 corresponds to a storage device of the invention.

The viewing program 41 is an application for viewing images of image data. The mode setting program 43 is run by the CPU 38 in response to running the viewing program 41, and selectively determines left-to-right and right-to-left directions according to the images or page information of the image data 47 as an electronic book or image sequence information, by receiving the contact information from the right and left side touch sensors 27 and 28. Assuming that the image sequence information is in the left-to-right direction, pages are turned one after another toward the right according to binding the pages in the book with a right spine. Assuming that the image sequence information is in the right-to-left direction, the pages are turned one after another toward the left according to binding the pages in the book with a left spine.

The disabling program 45 is started up by the CPU 38 in response to running the viewing program 41, and disables detection of a selected one of the right and left side touch sensors 27 and 28 according to the direction setting for the left-to-right direction and right-to-left direction according to the page information.

A long tapping movement on the right and left side touch sensors 27 and 28 is associated with operation of direction setting. The disabling program 45 is run to perform a task of disabling. To this end, a counter 48 or timer in the CPU 38 measures elapsed time of detecting the contact information of touch operation at the side touch sensor 27 or 28.

In case it is detected that the elapsed time or value of the counter 48 has become a predetermined value, then the CPU 38 judges the right-to-left direction for the image data 47 in the case of contacting the left side touch sensor 28, and judges the left-to-right direction for the image data 47 in the case of contacting the right side touch sensor 27.

Assuming that the left-to-right direction is set by the direction setting, the CPU 38 disables a function of the left side touch sensor 28. Assuming that the right-to-left direction is set by the direction setting, the CPU 38 disables a function of the right side touch sensor 27. The CPU 38 and the disabling program 45 correspond to the disabling device of the invention.

Note that the direction setting can be performed not by the long tapping movement but by double tapping movement of quickly tapping at two times. The direction setting is an example for selecting one of the left-to-right and right-to-left directions.

The definition data 44 is data of definition related to a function corresponding to the contact information obtained from the right and left side touch sensors 27 and 28. An example of the definition data 44 is data of forward page turning in the case of setting the left-to-right direction and upon detecting the contact information of the first rubbing movement 53 at the right side touch sensor 27. The definition data 44 is also data of backward page turning upon detecting the contact information of second rubbing movement or slide movement.

Figure 7:
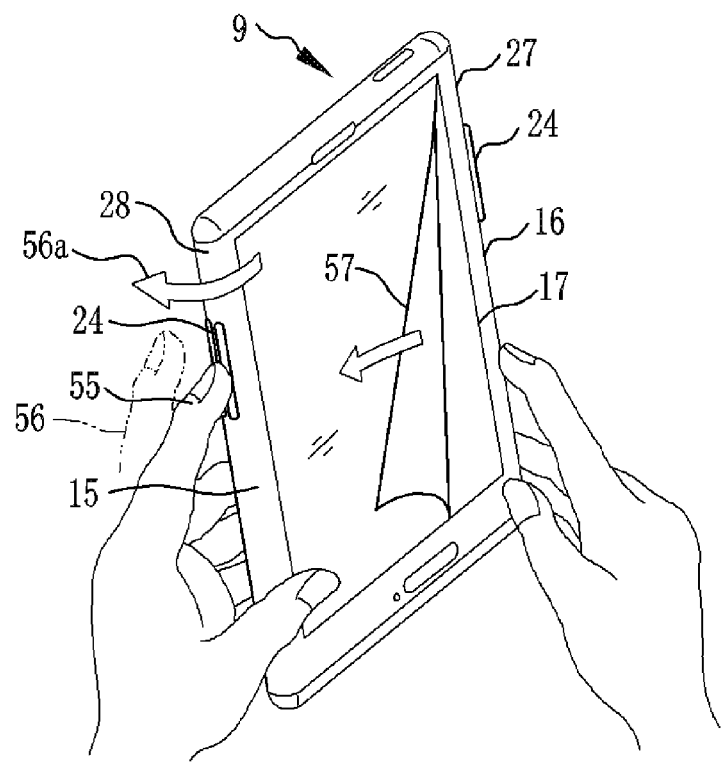
FIG. 7 is a perspective view illustrating a state of forward page turning in a right-to-left direction.

In FIG. 7, forward page turning in a right-to-left mode is illustrated. According to the right-to-left mode, third rubbing movement 56 in a rubbing direction 56a of the arrow as a back side direction away from the display screen 17 causes the display screen 17 to display page turning in the right-to-left direction. The definition data 44 is so formed as to set the forward page turning assuming that the right-to-left direction is set and assuming that contact information of the third rubbing movement 56 is detected by the left side touch sensor 28. Also, definition data in the right-to-left mode is so formed as to set backward page turning for displaying a preceding page upon occurrence of a fourth rubbing movement in a front side direction reverse to the rubbing direction 56a.

The touch recognition program 46 supplies the CPU 38 with control information of various examples according to the contact information input by the touch sensor interface 19 and the right and left side touch sensors 27 and 28. Examples of the control information include direction setting of a direction or orientation of page turning, forward page turning and backward page turning. The CPU 38 judges which of the left-to-right and right-to-left directions is set according to the touch recognition by the touch recognition program 46.

The forward page turning and backward page turning are recognized by the CPU 38 according to the contact information from the side touch sensor 27 or 28 and the definition data 44. The CPU 38 and the touch recognition program 46 correspond to a touch recognition device in the invention.

The CPU 38 controls functions of the electronic book reader 9 including various elements. The CPU 38 refers to various data read out from the storage medium 37 or data developed by use of the RAM 39, performs tasks according to commands in the program read from the storage medium 37, and controls the display screen 17, the communication interface 36 and the like for the functions. Note that programs and data used by the CPU 38 can be downloaded remotely from an external server apparatus by use of wireless communication of the communication interface 36.

The CPU 38 runs the viewing program 41 to view the image data 47. The CPU 38 runs the touch recognition program 46 to specify contact information in response to contact of various types detected by the touch sensor interface 19 and the right and left side touch sensors 27 and 28, and performs tasks associated with the contact information. The CPU 38 runs the information processing program 42 for the display screen 17 to display a menu image for various functions. Note that plural programs are executable in the CPU 38 simultaneously by a multi-task function provided by the program of the Operating System (OS).

The RAM 39 is a working memory for temporarily storing program code of programs run by the CPU 38, data referred to by the CPU 38, and results of arithmetic operation of the CPU 38.

The image data 47 in the electronic book include images and information of a sequence of the images. Note that the image data 47 can be input or retrieved externally from the communication interface 36. The image data 47 correspond to image sequence information according to the invention.

The information processing program 42 causes the display screen 17 to display an image or text in cooperation with functions of the various programs. According to the information processing program 42, the CPU 38 performs display control of an image of designated image data. In response to contact information for forward page turning, the CPU 38 causes display control of a succeeding image. In response to contact information for backward page turning, the CPU 38 causes display control of a preceding image. The CPU 38 and the information processing program 42 correspond to an information processing device of the invention.

Figure 8:
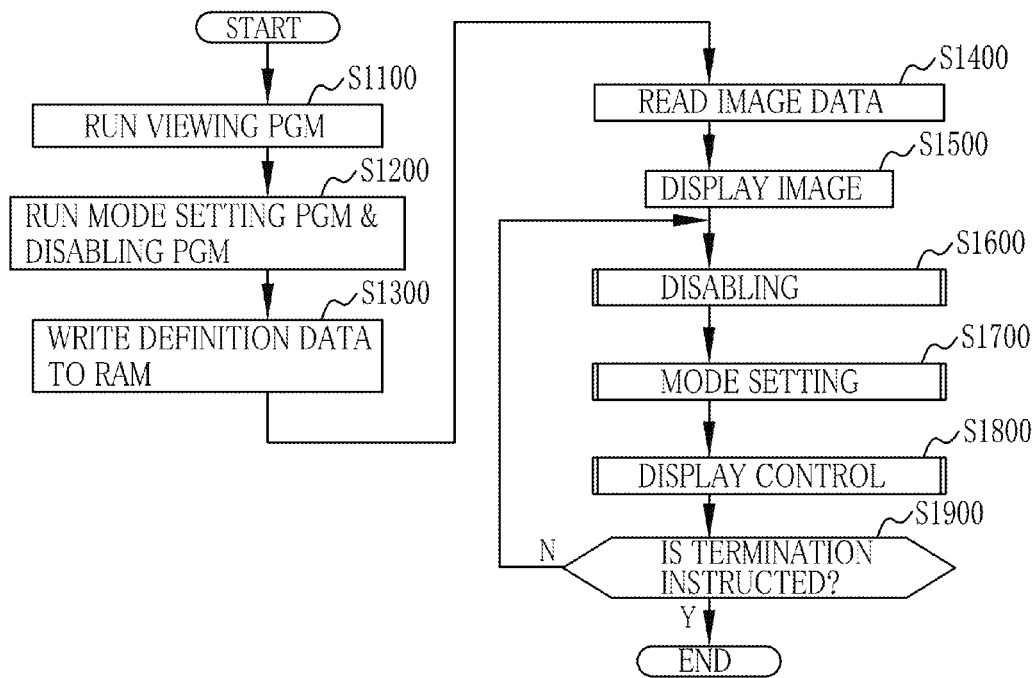
FIG. 8 is a flow chart illustrating page turning.

The operation of the embodiment is described now. In FIG. 8, steps of display control of the image data 47 as an electronic book are illustrated. The CPU 38 runs the main program in response to turning on of the power button 23, for performing the steps in FIG. 8.

Icons are displayed on the display screen 17 and linked with the viewing program 41. The CPU 38 runs the viewing program 41 in the step S1100 in response to tapping one of the icons corresponding to the viewing program 41. Also, the CPU 38 starts up the mode setting program 43 and the disabling program 45 in response to running the viewing program 41 in the step S1200. The CPU 38 loads the RAM 39 with the definition data 44 by readout in the step S1300.

A user specifies one of images of the image data 47 to be viewed upon running the viewing program 41. The CPU 38 performs control to read out the part of the image data 47 being specified in the step S1400. For example, a first page or an image read among the images of the image data 47 is displayed on the display screen 17 by the viewing program 41 in the step S1500. Note that there is a prereading step of prereading the remainder of images among the images of the image data 47 by the CPU 38 to the RAM 39. For further viewing, the CPU 38 comes to perform control readout of images of the image data 47 from the RAM 39.

The CPU 38 according to the viewing program 41 performs tasks of disabling in the step S1600, mode setting in the step S1700, and display control in the step S1800. In response to an input for termination, the CPU 38 terminates the viewing program 41 (yes in the step S1900).

Figure 9:
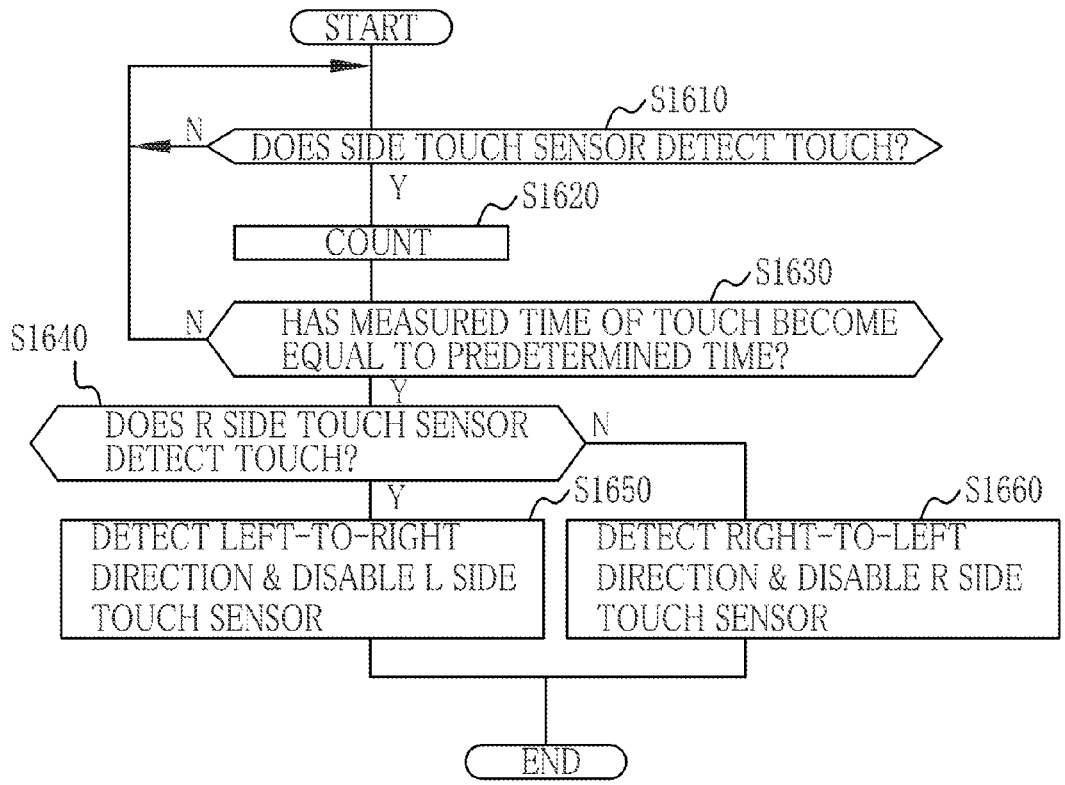
FIG. 9 is a flow chart illustrating steps of disabling.

In FIG. 9, steps of disabling are illustrated. The CPU 38 runs the disabling program 45. Contact of a finger is detected by the CPU 38 according to contact information from the side touch sensor 27 or 28 in the step S1610. Time of detection of the contact information of continuous contact of the finger is measured by counting in the counter 48 in the step S1620. Assuming that the measured time comes up to a predetermined time according to the measurement in the counter 48 (yes in the step S1630), then the CPU 38 judges the left-to-right direction for turning in the image of the image data 47 according to the contact of the right side touch sensor 27 (yes in the step S1640). The CPU 38 disables detection of the left side touch sensor 28 in the step S1650. Assuming that the sensor of the contact is the left side touch sensor 28 (no in the step S1640), then the CPU 38 judges the right-to-left direction for turning in the image of the image data 47. The CPU 38 disables detection of the right side touch sensor 27 in the step S1660.

Figure 10:
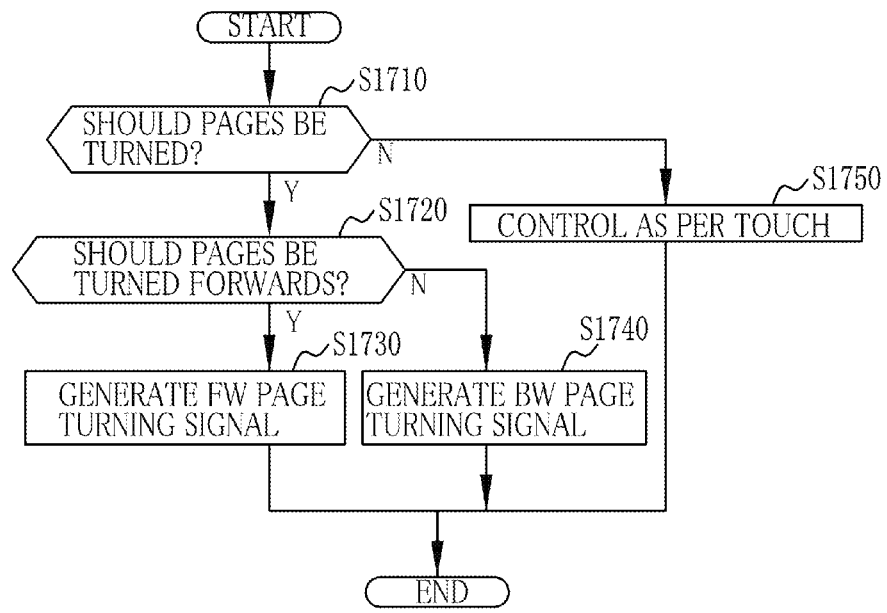
FIG. 10 is a flow chart illustrating steps of mode setting.

In FIG. 10, steps of the mode setting are illustrated. The mode setting program 43 is run by the CPU 38 for the mode setting. At first, the CPU 38 checks whether page turning should be carried out in the step S1710 according to whether the contact information from an enabled one of the right and left side touch sensors 27 and 28 denotes the rubbing movement in the thickness direction or not. Assuming that the CPU 38 judges that the page turning should be carried out, then the CPU 38 checks whether pages should be turned forwards or backwards according to the first or third rubbing movement 53 or 56, namely, rubbing movement in the back side direction (53*a*, 56*a*) away from the display screen 17. Assuming that the CPU 38 detects occurrence of the first or third rubbing movement 53 or 56, the CPU 38 judges that the pages should be turned forwards (yes in the step S1720), and generates a forward page turning signal in the step S1730. Assuming that the CPU 38 detects occurrence of second or fourth rubbing movement in a front side direction toward the display screen 17, the CPU 38 judges that the pages should be turned backwards (no in the step S1720), and generates a backward page turning signal in the step S1740. Assuming that the CPU 38 does not judge that the pages should be turned, then the CPU 38 performs a task according to the contact information in the step S1750.

Figure 11:
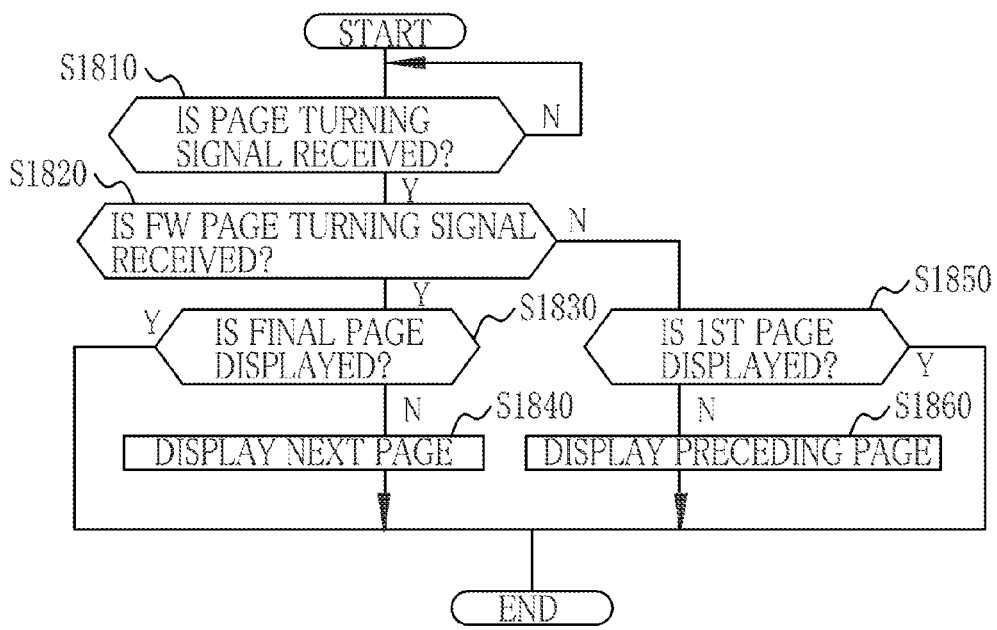
FIG. 11 is a flow chart illustrating display control.

In FIG. 11, display control is illustrated. The information processing program 42 is run by the CPU 38. The CPU 38 monitors reception of a page turning signal in the step S1810, and upon receiving the page turning signal (yes in the step S1810), checks whether the signal is a forward page turning signal or backward page turning signal in the step S1820. Assuming that the signal is a forward page turning signal (yes in the step S1820), it is checked whether the display page is final in the step S1830. Assuming that the display page is not final (no in the step S1830), the CPU 38 performs display control to display a succeeding page in the step S1840. Assuming that the display page is final, the CPU 38 does not change over the display page but continues displaying the final page. Assuming that the signal is a backward page turning signal (no in the step S1820), it is checked whether the display page is a first page in the step S1850. Assuming that the display page is not the first page (no in the step S1850), the CPU 38 performs display control to display a preceding page in the step S1860. Assuming that the display page is the first page, the CPU 38 does not change over the display page but continues displaying the first page.

The left-to-right or right-to-left direction for a document feed direction of the image data 47 is specified and input by a user according to horizontal or vertical writing of a text included in images of the image data 47, or according to a direction of an object image in the images. In FIG. 12, information of definition is illustrated, the definition being used for specifying a touch sensor to be disabled and a direction of a rubbing movement for forward page turning according to the direction setting of the page information.

As examples of the image data 47, electronic books of page turning in the right-to-left direction are those with text in English and text in Japanese in horizontal writing of characters. Electronic books of page turning in the left-to-right direction are those with text in Japanese in vertical writing of characters, especially in the fields of literature, law, language education, magazines and cartoons (manga).

As described heretofore, assuming that the user wishes to set the left-to-right direction, he or she taps an area of the right side surface 16 including the contact surface portion 24 (touch pad device) for long tapping movement. The CPU 38 enables the right side touch sensor 27 to detect contact, and disables the left side touch sensor 28. The CPU 38 responds to the first rubbing movement for the forward page turning in relation to the right side touch sensor 27. It is possible to prevent a problem of incidental page turning even upon contact of a left hand with the left side touch sensor 28, because the left side touch sensor 28 is disabled from detecting contact. In FIG. 12, the CPU 38 responds to the second rubbing movement for the backward page turning reverse to the forward page turning.

Assuming that the user wishes to set the right-to-left direction of turning, he or she taps an area of the left side surface 15 including the contact surface portion 24 for long tapping movement. The CPU 38 enables the left side touch sensor 28 to detect contact, and disables the right side touch sensor 27. The CPU 38 responds to the third rubbing movement for the forward page turning in relation to the left side touch sensor 28. Also, the CPU 38 responds to the fourth rubbing movement for the backward page turning reverse to the forward page turning.

While the left-to-right direction for turning is set, the right index finger 52 of the user performs the first rubbing movement 53 of the contact surface portion 24 of the right side surface 16. The right side touch sensor 27 detects contact information of the first rubbing movement 53, for the CPU 38 to change over the image data 47 to next image.

The first rubbing movement 53 is performed on the surface of the touch bar devices 25 (touch patterns) arranged at the regular interval, so that the user can be given feeling of touching an edge of pages of an actual book. Furthermore, an effect image 54 (transition image) of wipe transition of diagonal wipe of FIG. 4 can be displayed during the page turning to next page as a short moving image of motion of page turning to the right.

While the right-to-left direction for turning is set, a left index finger 55 of the user performs the third rubbing movement 56 on the contact surface portion 24 of the left side surface 15. See FIG. 7. The left side touch sensor 28 detects contact information of the third rubbing movement 56, for the CPU 38 to perform display control with an effect image 57 (transition image) of wipe transition of diagonal wipe toward the left, and change over the image data 47 to next image.

In the above embodiment, the rubbing movement for page turning is rubbing movement in a thickness direction in relation to the display screen 17. However, rubbing movement for page turning can be rubbing movement of FIGS. 13-15 in a longitudinal direction of the touch bar devices 25 in the contact surface portion 24 along each side surface of the display screen 17.

In FIG. 13, page turning is carried out by a linear rubbing movement in the longitudinal direction or vertical direction for the contact surface portion 24. Direction setting according to the page information and definition of a sensor disabled according to the direction setting are the same as that of FIG. 12. However, there is a difference in that a fifth rubbing movement toward the upper surface 13 is defined for forward page turning. Note that a sixth rubbing movement toward the lower surface 14 is defined for backward page turning, although not shown in FIG. 13.

Figure 14:
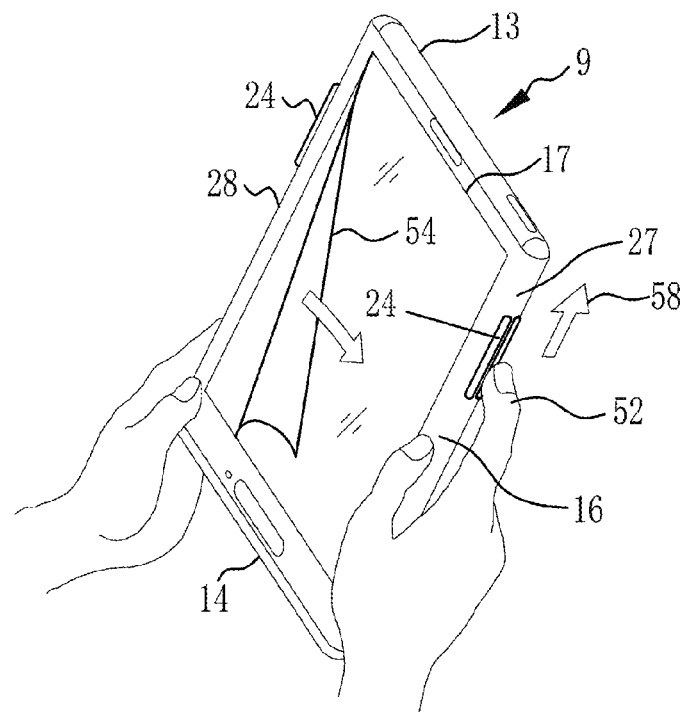
FIG. 14 is a perspective view illustrating a state of forward page turning in a left-to-right direction.

In FIG. 14, forward page turning in a left-to-right mode is illustrated. The right index finger 52 of the user performs a rubbing movement in an upward rubbing direction 58 of the arrow on the contact surface portion 24 of the right side surface 16. The CPU 38 detects the contact information of the fifth rubbing movement from the right side touch sensor 27, and performs information processing of the image data 47 for page turning to next page. Assuming that the CPU 38 detects the contact information of the sixth rubbing movement in a downward direction reverse to the upward rubbing direction 58, the CPU 38 recognizes backward page turning to a preceding page.

Figure 15:
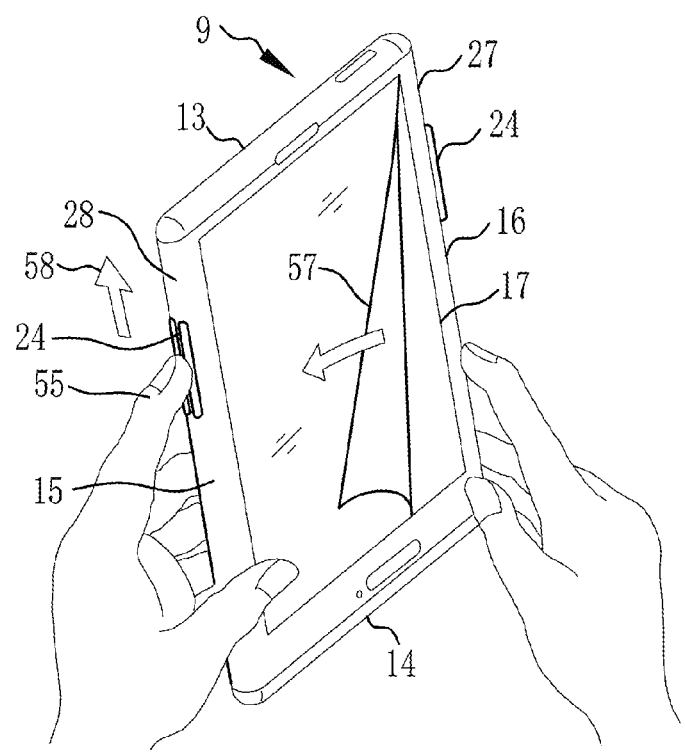
FIG. 15 is a perspective view illustrating a state of forward page turning in the right-to-left direction.

In FIG. 15, forward page turning in the right-to-left mode is illustrated. The left index finger 55 of the user performs a seventh rubbing movement in the upward rubbing direction 58 of the arrow on the contact surface portion 24 of the left side surface 15. The left side touch sensor 28 detects the contact information of the seventh rubbing movement. The CPU 38 performs information processing of the image data 47 for page turning to next page. Assuming that the CPU 38 detects the contact information of an eighth rubbing movement in the downward direction reverse to the upward rubbing direction 58, the CPU 38 recognizes backward page turning to a preceding page.

In the above embodiments, one of the right and left side touch sensors 27 and 28 tapped in long tapping movement is enabled. However, it is possible to enable one of the right and left side touch sensors 27 and 28 on a side opposite to that tapped in long tapping movement. In the above embodiments, in case long tapping movement of the right side surface 16 is associated with the left-to-right mode, the left side touch sensor 28 is disabled and the right side touch sensor 27 is enabled. However, it is possible to disable the right side touch sensor 27 and enable the left side touch sensor 28.

Figure 17:
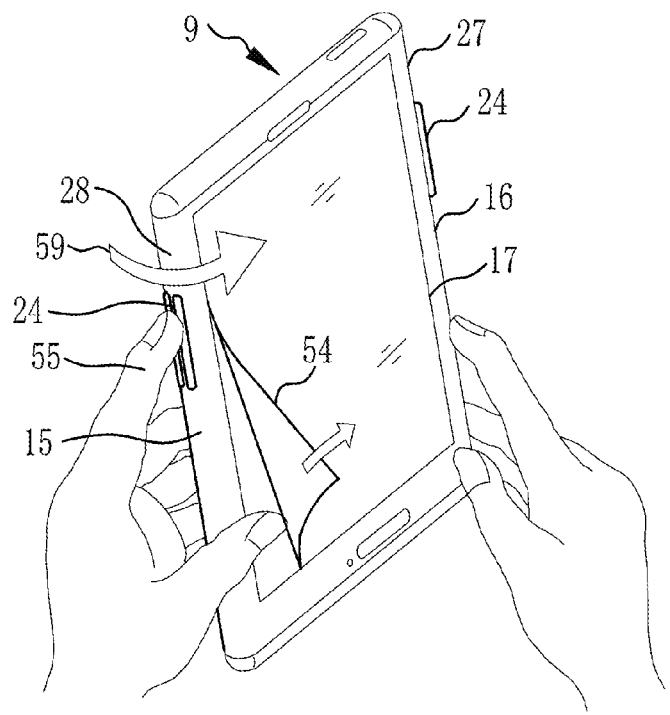
FIG. 17 is a perspective view illustrating a state of forward page turning in the left-to-right direction.
Figure 18:
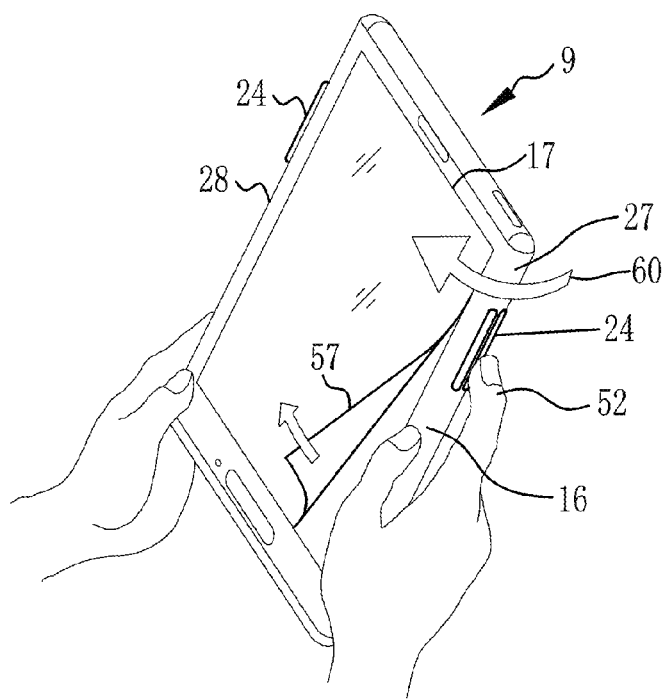
FIG. 18 is a perspective view illustrating a state of forward page turning in the right-to-left direction.

In FIGS. 16-18, another preferred embodiment is illustrated, in which a rubbing movement in the front side direction is associated with forward page turning. In FIG. 16, detection of the right side touch sensor 27 is disabled and detection of the left side touch sensor 28 is enabled while the left-to-right direction for turning is set. For setting of the left-to-right direction, the contact surface portion 24 of the left side touch sensor 28 is touched manually in a long tapping movement. Then the CPU 38 enables the left side touch sensor 28 to detect contact, and disables the right side touch sensor 27.

In FIG. 17, forward page turning in the left-to-right mode is illustrated. While the left-to-right mode is set, the left side touch sensor 28 detects a ninth rubbing movement in the front side direction toward the display screen 17 on the contact surface portion 24 of the left side surface 15, the CPU 38 recognizes forward page turning. Then the CPU 38 performs information processing of the image data 47 for page turning to next page. Assuming that the CPU 38 detects the contact information of a tenth rubbing movement in the back side direction away from the display screen 17, the CPU 38 recognizes backward page turning to a preceding page.

In FIG. 18, forward page turning in the right-to-left mode is illustrated. For setting of the right-to-left mode, the contact surface portion 24 of the right side touch sensor 27 is touched manually in a long tapping movement. Then the CPU 38 enables the right side touch sensor 27 to detect contact, and disables the left side touch sensor 28.

Assuming that the right-to-left direction for turning is selected, the CPU 38 detects contact information of an eleventh rubbing movement in the front side direction toward the display screen 17 on the contact surface portion 24 of the right side surface 16 with the right index finger 52, and controls the display of the image data 47 to a succeeding page. In case contact information of a twelfth rubbing movement in the back side direction away from the display screen 17 is detected, the CPU 38 recognizes backward page turning.

In FIGS. 19-22, still another preferred embodiment is illustrated, in which pages are turned by utilizing the side touch sensor 27 or 28 on a side opposite to that used in the embodiment of FIGS. 1-12. In FIG. 19, definition of contact information of the embodiment is illustrated, in which detection of the right side touch sensor 27 is disabled and detection of the left side touch sensor 28 is enabled while the left-to-right direction for turning is set. For setting of the left-to-right direction, the contact surface portion 24 of the left side touch sensor 28 is touched manually in a long tapping movement. Then the CPU 38 enables the left side touch sensor 28 to detect contact, and disables the right side touch sensor 27.

Figure 20:
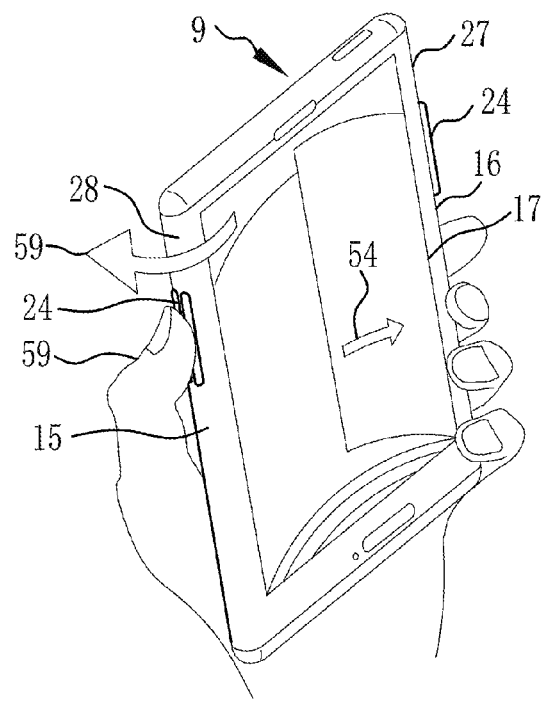
FIG. 20 is a perspective view illustrating a state of forward page turning in the left-to-right direction.

In FIG. 20, forward page turning in the left-to-right mode of FIG. 19 is illustrated. While the left-to-right mode is set, the left side touch sensor 28 detects a thirteenth rubbing movement of a left thumb 59 in a back side direction away from the display screen 17 on the contact surface portion 24 of the left side surface 15, so the CPU 38 recognizes forward page turning. In response to the thirteenth rubbing movement, the CPU 38 performs information processing of the image data 47 for page turning to next page. Assuming that the CPU 38 detects the contact information of a fourteenth rubbing movement of the left thumb 59 in a front side direction toward the display screen 17, the CPU 38 recognizes backward page turning to a preceding page. Note that the electronic book reader 9 can be held only by a left hand in FIG. 20, because the fourteenth rubbing movement can be performed by the left thumb 59.

Figure 21:
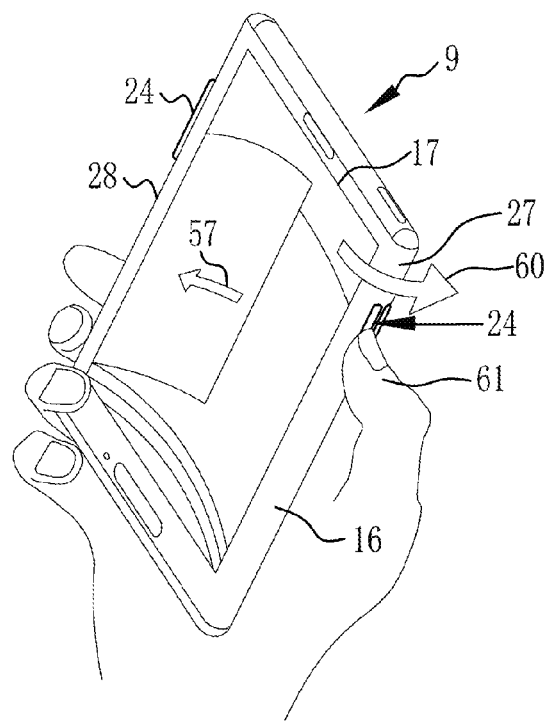
FIG. 21 is a perspective view illustrating a state of forward page turning in the right-to-left direction.

In FIG. 21, forward page turning in the right-to-left mode is illustrated. For setting of the right-to-left mode, the contact surface portion 24 of the right side touch sensor 27 is touched manually in a long tapping movement. Then the CPU 38 enables the right side touch sensor 27 to detect contact, and disables the left side touch sensor 28.

While the right-to-left direction for turning is set, the CPU 38 detects contact information of a fifteenth rubbing movement in a back side direction away from the display screen 17 with a right thumb 61 on the contact surface portion 24 of the right side surface 16 in FIG. 21. The CPU 38 changes over the display to a succeeding page. In contrast, in case contact information of sixteenth rubbing movement in a front side direction toward the display screen 17 with the right thumb 61 is detected, the CPU 38 recognizes backward page turning. In FIG. 21, the right thumb 61 can perform the fifteenth rubbing movement, so that the electronic book reader 9 can be manually held by a right hand of the user.

Figure 22:
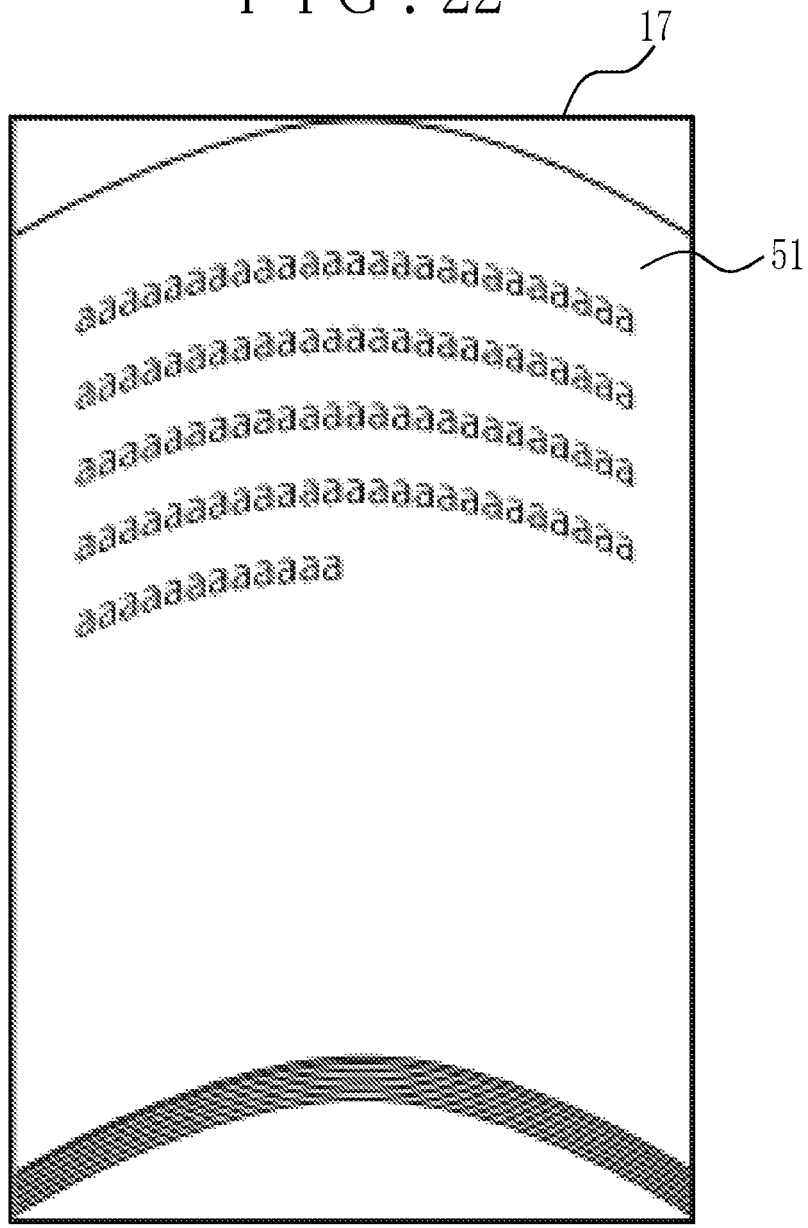
FIG. 22 is a front elevation illustrating a transition image for use in the course of the page turning.

In the embodiment of FIGS. 19-21, the direction of the rubbing movement of a finger and the direction of page turning are opposite to those according to the embodiment of FIGS. 16-18. This is similar to actual handling of a book in which the user's hand is placed to support the rear surface 12 to flex pages by directing a center of a lower surface of the book in the front side direction, and edges of the pages are rubbed and turned by use of the hand. Thus, it is preferable further to display an image of simulation of motion of pages given upon changing over the pages. For example, a transition image 51 of FIG. 22 is displayed on the display screen 17 by the information processing program 42 in a form of pages convexly flexed at the center of the book, while the pages are changed over by running the viewing program 41. Examples of the transition image 51 are an animation image, CG image (computer graphics image) and other moving images.

In the above embodiments, pages are turned by one page in response to a rubbing movement. However, the scope of the invention is not limited to this structure. Browsing of plural pages can be associated with a particular movement of contact. For example, the CPU 38 performs display control of a view of plural images arranged together in response to a rubbing movement or tapping movement in a particular contact area other than the contact surface portion 24 in an active range of the right and left side surfaces 15 and 16 having the right and left side touch sensors 27 and 28. Examples of the particular contact area are portions higher and lower than the contact surface portion 24 and in front of and behind the contact surface portion 24. Note that the contact surface portion 24 corresponds to the first contact area of the invention. The particular contact area corresponds to the second contact area of the invention.

Figure 23:
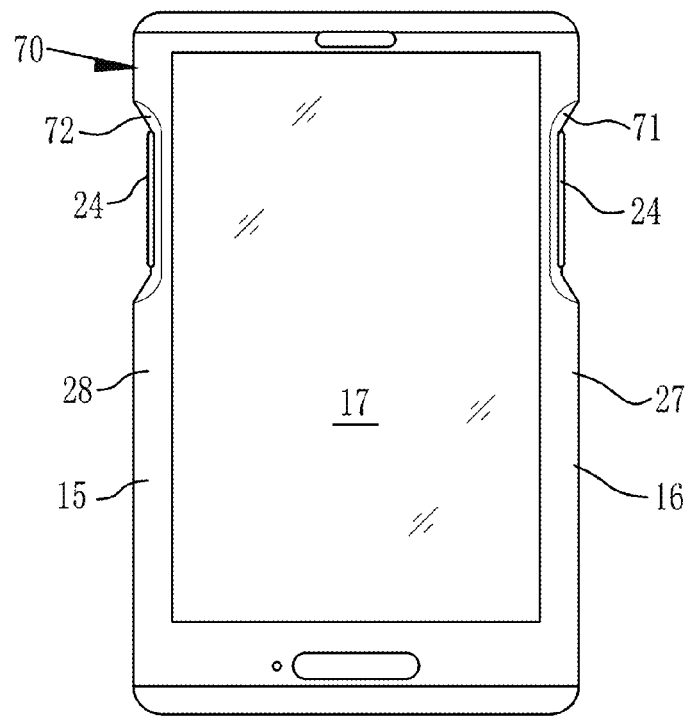
FIG. 23 is a front elevation illustrating an electronic book reader with a lateral recess.

In FIG. 23, another preferred electronic book reader 70 or portable electronic equipment or image display apparatus includes lateral recesses 71 and 72 each of which has the contact surface portion 24. The right side touch sensor 27 is disposed in a range including the lateral recess 71 in the right side surface 16. The left side touch sensor 28 is disposed in a range including the lateral recess 72 in the left side surface 15. Thus, holding of the electronic book reader 70 with one hand can be reliable owing to the lateral recesses 71 and 72. A preferable position of the lateral recess 71 in the right side surface 16 can be predetermined in compliance with a thumb of a right hand. A preferable position of the lateral recess 72 in the left side surface 15 can be predetermined in compliance with an index finger of the right hand.

Figure 24:
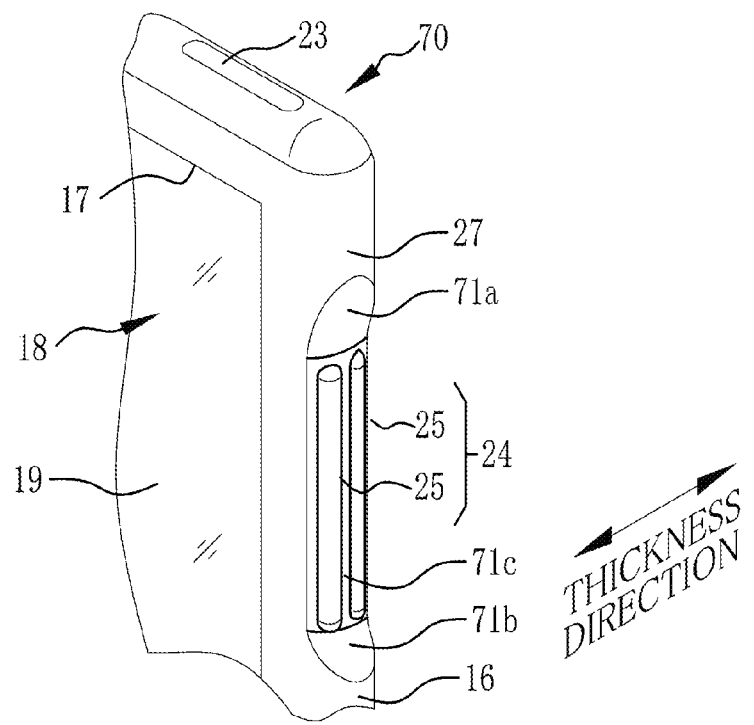
FIG. 24 is a perspective view illustrating the lateral recess.

In FIG. 24, the lateral recess 71 of FIG. 23 is illustrated in enlargement. The lateral recess 71 includes an upper inclined surface 71$a$ as a second contact area, a lower inclined surface 71$b$ as a second contact area, and a recessed surface 71$c$ as a first contact area. At least the recessed surface 71$c$ is curved in relation to the thickness direction. The contact surface portion 24 is disposed on the recessed surface 71$c$. The CPU 38 detects the rubbing movement in the range of the recessed surface 71$c$, and recognizes command of page turning by one page. The CPU 38 detects rubbing movement, tapping movement or the like in the range of the upper or lower inclined surface 71$a$ or 71$b$, and recognizes command of display of plural pages at one time. For the lateral recess 72 of the left side surface 15, the form of the lateral recess 71 of the right side surface 16 is repeated. This is effective in manually handling the book reader for browsing easily with one hand. The recessed surface 71$c$ including the contact surface portion 24 is one example corresponding to a first contact area. The upper and lower inclined surfaces 71$a$ and 71$b$ are examples corresponding to a second contact area.

Figure 25:
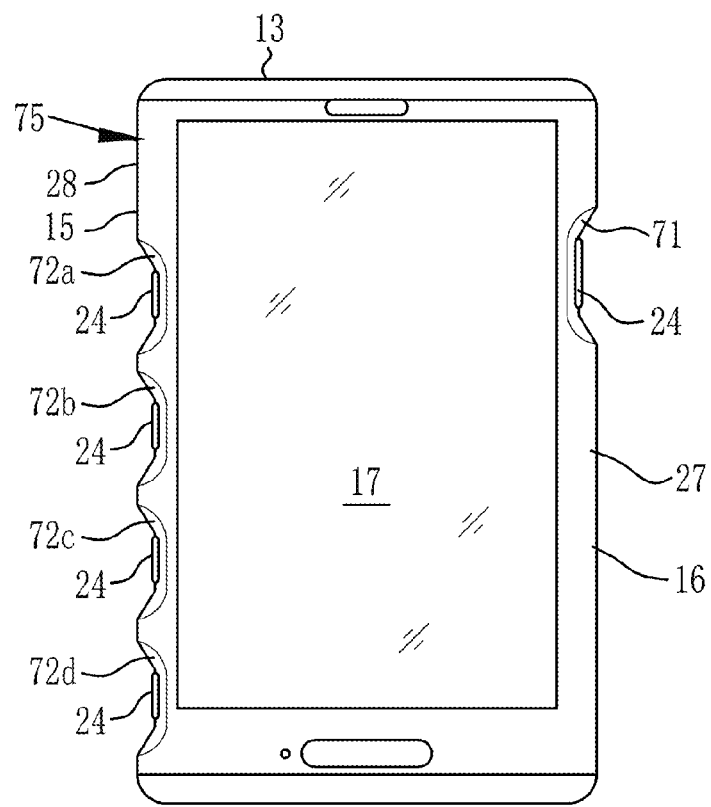
FIG. 25 is a front elevation illustrating an electronic book reader with plural lateral recesses.

In FIG. 25, another preferred electronic book reader 75 or portable electronic equipment or image display apparatus includes plural lateral recesses 72$a$, 72$b$, 72$c$ and 72$d$ formed in the left side surface 15. Positions of the lateral recesses 72$a$-72$d$ are determined suitably for fingers of a right hand of a user for the purpose of reliable manual holding, the fingers including an index finger, middle finger, ring finger and small finger in a downward direction from the upper surface 13. The contact surface portion 24 is disposed in each of the lateral recesses 72$a$-72$d$. The left side touch sensor 28 is disposed in the left side surface 15 having the lateral recesses 72$a$-72$d$.

To enable detection in the left side touch sensor 28 of the left side surface 15 with the lateral recesses 72$a$-72$d$ according to the direction setting for the page turning, it is possible to enable detection of contact information according to one of the lateral recesses 72$a$-72$d$ and disable detection of contact information according to the remainder of the lateral recesses 72$a$-72$d$.

Note that the contact surface portion 24 can be disposed in only limited lateral recesses among the lateral recesses 72$a$-72$d$. Page turning of any one of the lateral recesses 72$a$-72$d$ with the contact surface portion 24 can be enabled. It is possible to perform the direction setting by use of one of the lateral recesses 72$a$-72$d$ that does not have the contact surface portion 24. The number of the lateral recesses 72$a$-72$d$ in the left side surface 15 in FIG. 25 is four, but can be two or three for holding with two or three among the index finger, middle finger, ring finger and little finger. Also, a plurality of lateral recesses can be formed in the right side surface 16 in the same manner as the lateral recesses 72a-72d in FIG. 25. For this structure, only one lateral recess can be formed in the left side surface 15 for reliable holding with a left hand.

Figure 26:
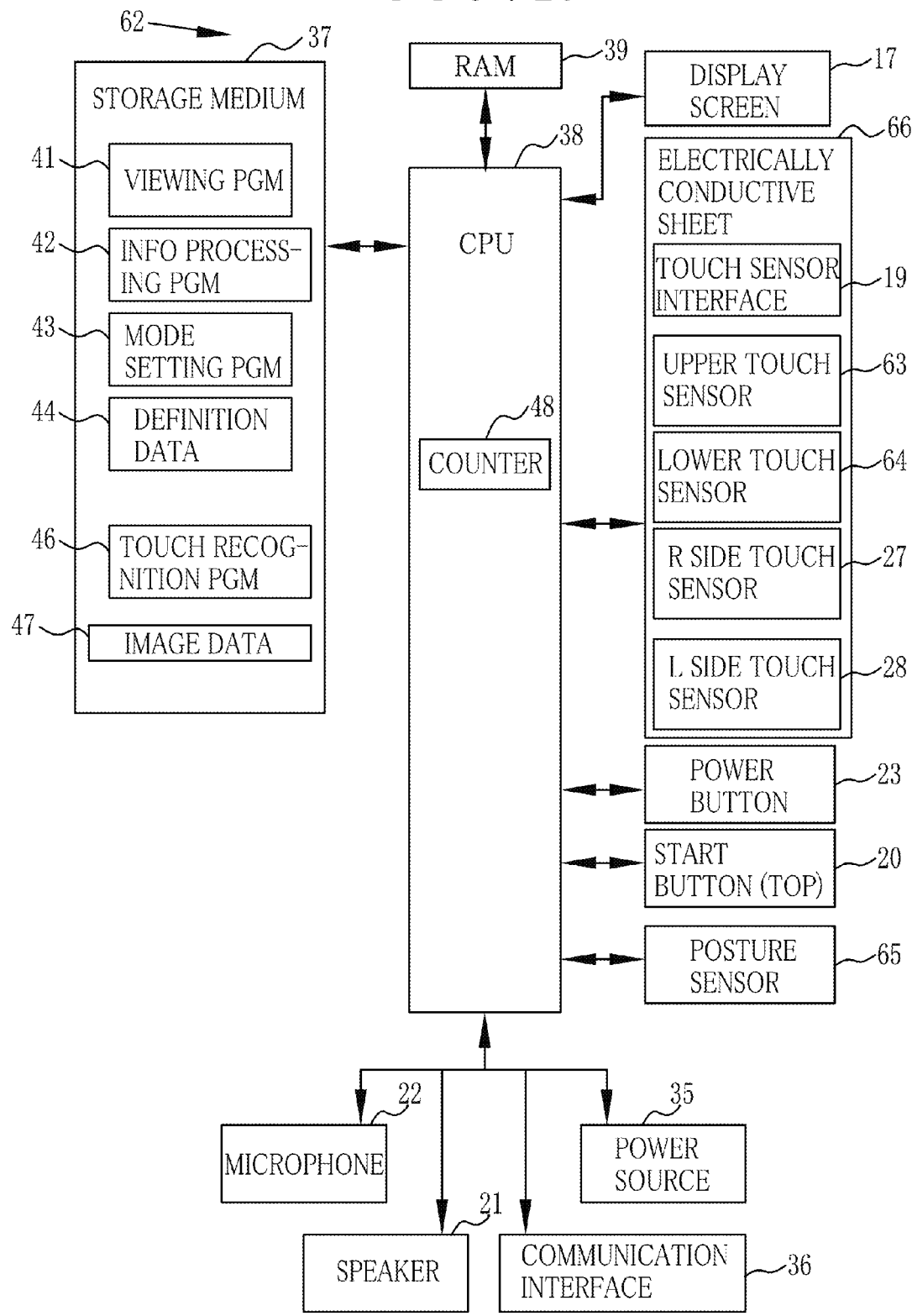
FIG. 26 is a block diagram illustrating an electronic book reader for a two-page view in a horizontal posture.

In FIG. 26, another preferred electronic book reader 62 or portable electronic equipment or image display apparatus is illustrated, in which images are displayed in a two-page view in the course of a horizontal posture. The electronic book reader 62 includes an upper touch sensor 63, a lower touch sensor 64 and a posture sensor 65. Unlike the electronic book reader 9 of FIG. 6, images of the two-page view are displayed upon detecting the horizontal posture in the posture sensor 65. In the two-page view, two images among those of the image data 47 are reduced in the size, arranged horizontally and displayed. Then the upper and lower touch sensors 63 and 64 are caused to detect rubbing movement, to change over the images by one set of two images.

In FIG. 26, an electrically conductive sheet 66 is used not only for the touch sensor interface 19 and the right and left side touch sensors 27 and 28 but also for the upper and lower touch sensors 63 and 64. Elements similar to those of FIG. 6 are designated with identical reference numerals.

Figure 27:
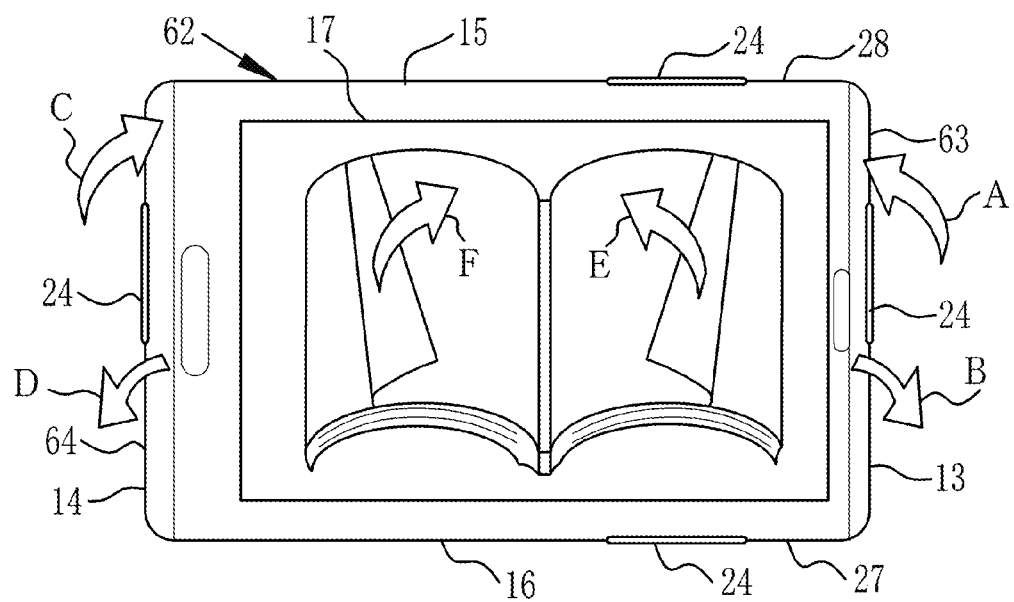
FIG. 27 is a front elevation illustrating the two-page view.

In FIG. 27, the two-page view in the horizontal posture is illustrated. While the electronic book reader 62 is oriented in the horizontal posture, the upper touch sensor 63 is positioned on the right side. The lower touch sensor 64 is positioned on the left side. At the same time, the left side touch sensor 28 is directed upwards. The right side touch sensor 27 is directed downwards. It is possible in another horizontal posture that the lower touch sensor 64 is positioned on the right side and that the upper touch sensor 63 is positioned on the left side. Description is hereinafter made in relation to the horizontal posture of FIG. 27. The posture sensor 65 detects the horizontal posture and sends information of the horizontal posture to the CPU 38.

Each of the upper and lower surfaces 13 and 14 has the contact surface portion 24. The contact surface portion 24 includes a plurality of the touch bar devices 25 as described with FIG. 2. The upper and lower touch sensors 63 and 64 are disposed in a range including the contact surface portion 24. Elements similar to those of FIG. 1 are designated with identical reference numerals.

Figure 28:
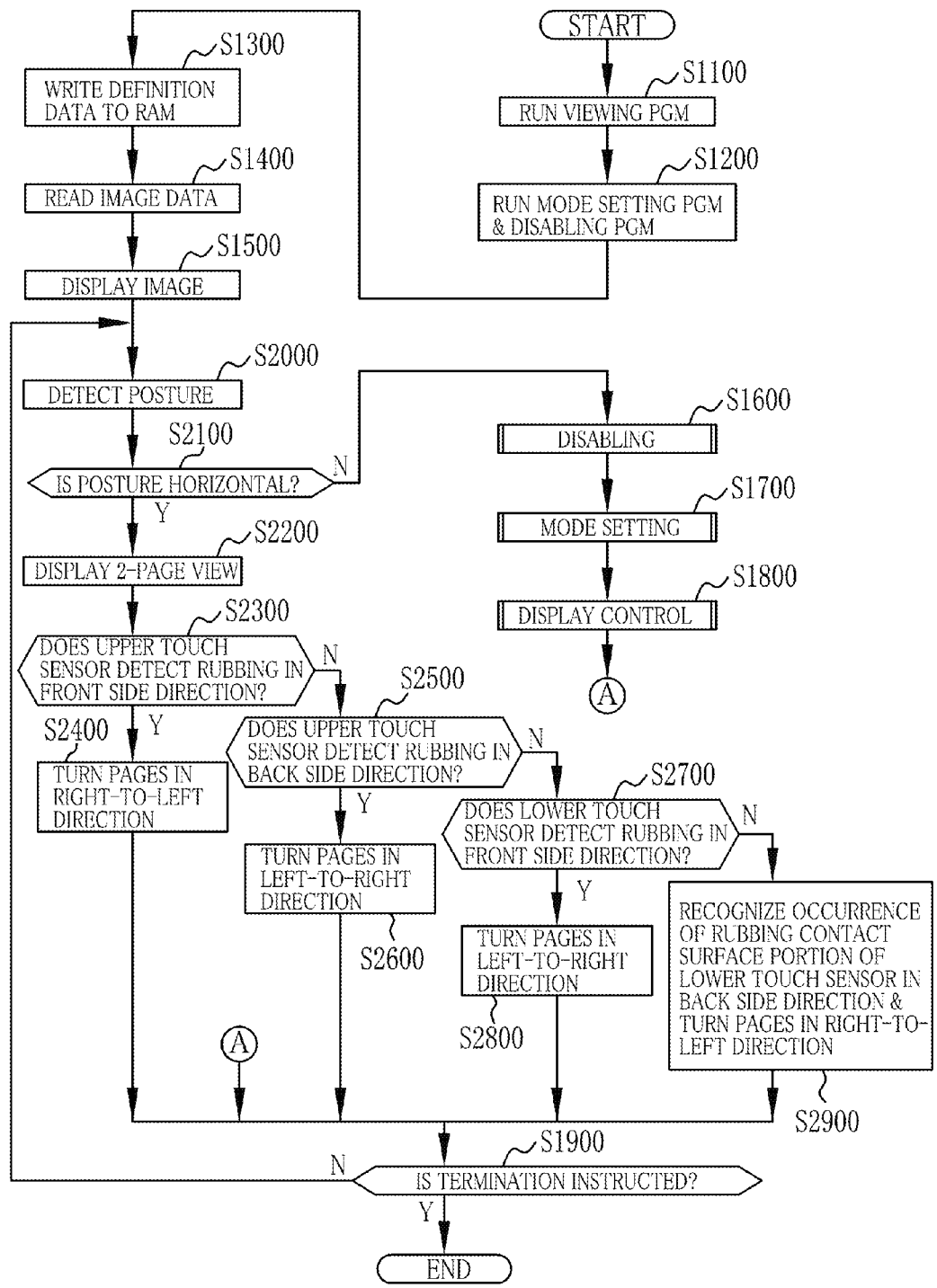
FIG. 28 is a flow chart illustrating steps for displaying the two-page view.

In FIG. 28, steps of viewing in the electronic book reader 62 of FIG. 26 are illustrated. In case the CPU 38 detects a horizontal posture (yes in the step S2100) by performing the posture detection in the step S2000, then the CPU 38 controls the display for a two-page view in the step S2200. Contact information of a rubbing movement of the upper touch sensor 63 in a front side direction of the arrow A of FIG. 27 toward the display screen 17 is detected (yes in the step S2300). Thus, the CPU 38 performs a task of page turning in the step S2400 in the right-to-left direction of the arrow E in FIG. 27.

Assuming that no rubbing movement in the front side direction is detected by the upper touch sensor 63 (no in the step S2300) and assuming that contact information of a rubbing movement in a back side direction of the arrow B in FIG. 27 away from the display screen 17 is detected (yes in the step S2500), then information processing of page turning is performed in the left-to-right direction of the arrow F in the step S2600.

Assuming that no rubbing movement in the back side direction is detected by the upper touch sensor 63 (no in the step S2500) and assuming that contact information of a rubbing movement in the front side direction of the arrow C in FIG. 27 toward the display screen 17 is detected (yes in the step S2700), then information processing of page turning is performed in the left-to-right direction of the arrow F in the step S2800.

Assuming that no rubbing movement in the front side direction is detected by the lower touch sensor 64 (no in the step S2700) and assuming that contact information of a rubbing movement in the back side direction of the arrow D in FIG. 27 away from the display screen 17 is detected (no in the step S2700), then information processing of page turning is performed in the right-to-left direction of the arrow E in the step S2900. Note that a relationship between the directions A-D of the rubbing movement and the left-to-right and right-to-left directions can be opposite to that described above in the manner of FIGS. 19-21.

Figure 29:
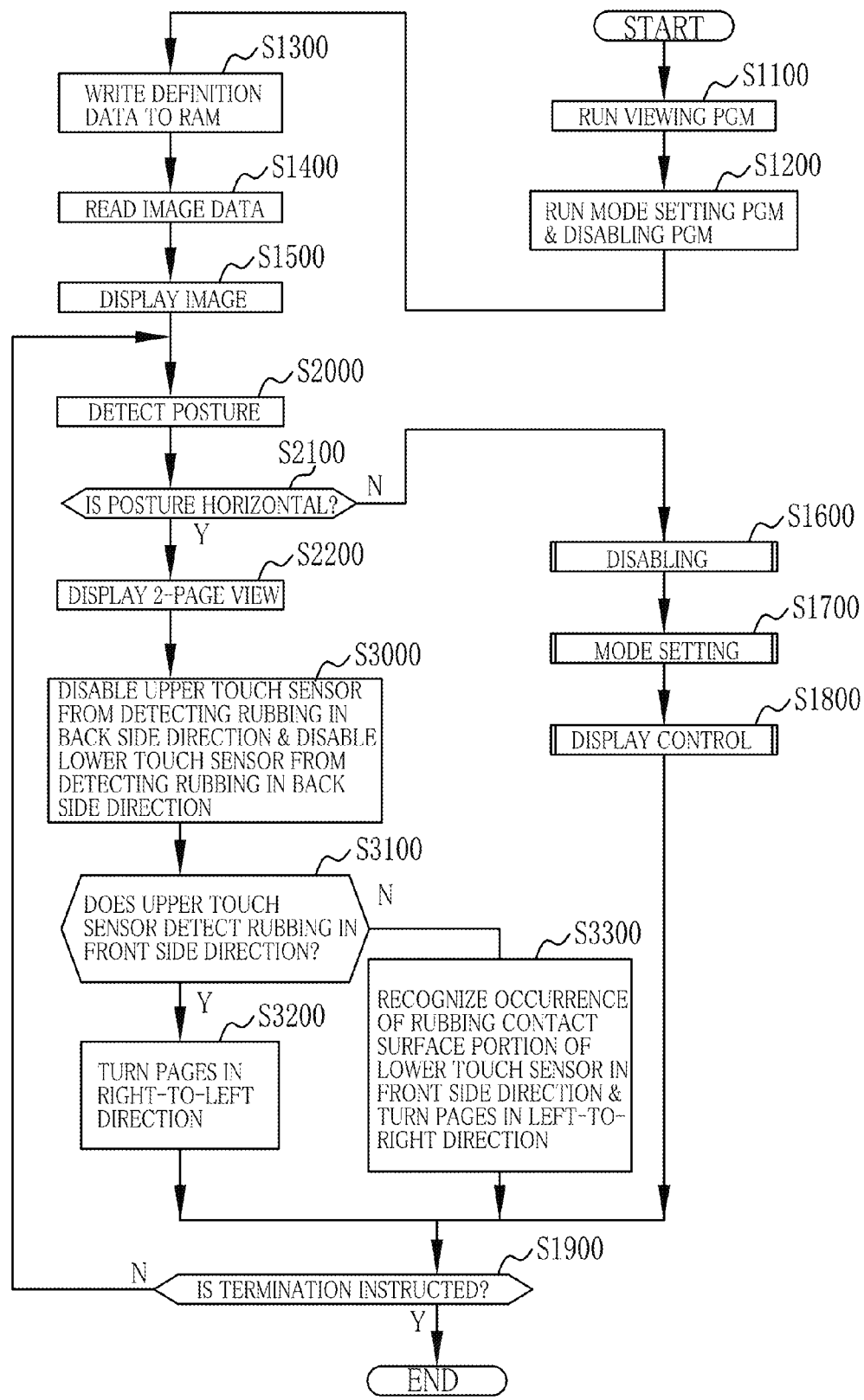
FIG. 29 is a flow chart illustrating a disabling operation.

In FIG. 29, an example of steps of viewing images is illustrated in a structure of adding the disabling device to the electronic book reader 62 in FIGS. 26 and 28. The disabling device is constituted by the storage medium. 37 and the disabling program installed therein in the manner of FIG. 6. The CPU 38 runs the disabling program, for example, detects the horizontal posture in FIG. 27. In the step S3000, the CPU 38 disables the upper touch sensor 63 from detecting a rubbing movement in the back side direction of the arrow B, and the lower touch sensor 64 from detecting a rubbing movement in the back side direction of the arrow D.

The CPU 38 upon detecting contact information of a rubbing movement on the upper touch sensor 63 in the front side direction of the arrow A in the step S3100 performs display control of page turning in the right-to-left direction in the step S3200. The CPU 38 upon detecting contact information of a rubbing movement on the lower touch sensor 64 in the front side direction of the arrow C performs display control of page turning in the left-to-right direction in the step S3300. It is possible to prevent unwanted page turning by inadvertent touch, because a task of disabling is performed in course of the two-page view.

In the case of judging the vertical posture in the embodiment of FIGS. 28 and 29, the steps of S1600-S1800 are performed in the same manner as those of FIG. 8.

Furthermore, it is possible by use of the disabling program to disable the upper touch sensor 63 from detecting a rubbing movement in the front side direction of the arrow A and disable the lower touch sensor 64 from detecting a rubbing movement in the front side direction of the arrow C, in response to detecting the horizontal posture. In case contact information of a rubbing movement in the back side direction of the arrow B is detected from the upper touch sensor 63, display control is performed for page turning in the right-to-left direction. In case contact information of a rubbing movement in the back side direction of the arrow D is detected from the lower touch sensor 64, display control is performed for page turning in the left-to-right direction.

In the embodiment of FIGS. 28 and 29, the two-page view is output selectively upon detecting the horizontal posture. However, the posture sensor 65 can be omitted. The two-page view can be output always irrespective of a posture. Even at the time of the vertical posture, the two-page view is output. Pages are turned by use of the right and left side touch sensors 27 and 28.

In the above embodiments, the left-to-right and right-to-left directions are determined by the direction setting. However, attribute information can be additionally associated with the image data or electronic book, inclusive of page turn information of the left-to-right and right-to-left directions. A user can automatically set the page turn information without manual input such for the direction setting, such as a long tapping movement. Also, disabling can be carried out automatically because of the automated direction setting.

In FIG. 30, another preferred electronic book reader 77 or portable electronic equipment or image display apparatus is illustrated, in which page turn information of page turning is automatically set. Attribute information is combined with the image data 47, and includes the page turn information. An attribute memory 78 is provided in the storage medium 37 for storing the attribute information. The page turn information is information of left-to-right and right-to-left directions of page turning. The CPU 38 reads the attribute information combined with the image data 47, and writes the attribute information to the attribute memory 78. The CPU 38 reads the page turn information from the attribute memory 78 in association with the attribute information, and automatically performs the direction setting for either one of the left-to-right and right-to-left directions.

In the above embodiments, the electronic equipment is the electronic book reader. However, electronic equipment of the invention is not limited to the electronic book reader. Examples of the electronic equipment are mobile telephone, information terminal device, portable communication device, PHS (personal handy-phone system), PDA (personal digital assistant), portable navigation device, personal computer, tablet, game machine and the like.

In the above embodiments, the touch bar devices 25 have the shape of the projections. However, the touch bar devices 25 can have a shape of recesses, or a smooth surface without a projecting or retreating form. The touch bar devices 25 of the smooth surface are a button area of a predetermined range in a manner similar to a touchscreen display device.

In FIG. 4, page turning of the electronic book in a left-to-right direction is performed in a form of displaying a transition image (54) of a triangular area at a lower left corner of the display screen for a succeeding page. However, pages can be turned in a form of extending a transition image of a triangular area from an upper left corner of the display screen in a downward direction to the right, or can be turned in a form of extending a transition image (54) of a quadrilateral area from a left edge portion of the display screen in a direction to the right as illustrated in FIG. 20. Also, a transition image in page turning can be formed in a manner of decreasing image density of a present page from a left corner or left edge portion of the display screen, and increasing the image density of a succeeding page. In short, a transition image in the page turning of the left-to-right direction can be an image positioned at a certain start position predetermined on the left edge portion in the display screen, on the basis of a method of wipe transition or dissolve transition (fade transition) of the display screen in the field of the moving image. Furthermore, a transition image can be one still image, or two or more still images besides a moving image.

In the above embodiments, the image data of the electronic book for page turning in the left-to-right direction is the electronic book with the text of Japanese in vertical writing of characters. However, a language of an electronic book may be any language of text with which pages are bound for page turning in the left-to-right direction, for example, Chinese, Korean and the like in vertical writing of characters.

According to preferred embodiment modes of the invention, the right side touch sensor is used for the image sequence information of page turning of the left-to-right direction, and the left side touch sensor is used for the image sequence information of page turning of the left-to-right direction.

In another preferred embodiment mode, the left side touch sensor is used for the image sequence information of page turning of the left-to-right direction, and the right side touch sensor is used for the image sequence information of page turning of the left-to-right direction.

Preferably, for the image sequence information of page turning of the left-to-right direction, the information processing device processes the image sequence information to locate a transition image between image pages to extend from a left edge portion of the display device, and for the image sequence information of page turning of the right-to-left direction, the information processing device processes the image sequence information to locate a transition image between image pages to extend from a right edge portion of the display device.

Preferably, the rubbing movement is in a longitudinal direction of the housing.

Preferably, the housing includes a rear surface disposed opposite to the front surface, and the rubbing movement is in a back side direction from the front surface toward the rear surface.

In another preferred embodiment mode, the housing includes a rear surface disposed opposite to the front surface, and the rubbing movement is in a front side direction from the rear surface toward the front surface.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. Electronic equipment comprising:
    a display device disposed on a front surface of a housing;
    a storage medium for storing image sequence information of plural images of a predetermined sequence;
    a display control unit for display control of displaying said image sequence information on said display device;
    a contact surface portion, disposed on at least one side surface of said housing, and tangible externally;
    a touch sensor for detecting rubbing movement in contact with said contact surface portion, to output contact information;
    a lateral recess formed in said at least one side surface, said contact surface portion and said touch sensor being disposed at said lateral recess;
    an information processing device, connected between said storage medium and said display control unit, provided with said contact information, for processing said image sequence information according to a direction of said rubbing movement for forward or backward page turning of said plural images,
    wherein said at least one side surface includes right and left side surfaces and wherein said touch sensor is constituted by a right side touch sensor disposed in said right side surface and a left side touch sensor disposed in said left side surface;
    wherein the electronic equipment is configured to perform functions of,
        selecting a left-to-right direction or a right-to-left direction for page turning according to said contact information from said right and left side touch sensors, and disabling one of said right and left side touch sensors from detecting contact according to a selection result of said selecting function, wherein said contact surface portion includes a first contact area, and the electronic equipment includes a second contact area separate from said contact surface portion, said second contact area including an upper inclined surface and a lower inclined surface, said upper and lower inclined surfaces being separate from the first contact area and disposed on opposite sides of said first contact area, wherein said information processing device, in case said first contact area is rubbed, processes said image sequence information in a mode for displaying said images by one image, and in case said second contact area is contacted, processes said image sequence information in a mode for simultaneously displaying a plurality of images among said images, wherein said right and left side touch sensors are constituted by one electrically conductive sheet in a flexible form, and wherein the contact surface portion includes touch bar devices that extend in a longitudinal direction, are arranged in a thickness direction, and are separated by a space therebetween.

2. The electronic equipment as defined in claim 1, wherein assuming that said mode setting device detects said contact information from one of said right and left side touch sensors, said disabling device disables a remaining one of said right and left side touch sensors.

3. The electronic equipment as defined in claim 1, further comprising:
an attribute memory for storing attribute information including page turn information of a left-to-right direction or a right-to-left direction for page turning;
a disabling device for disabling one of said right and left side touch sensors from detecting contact according to said page turn information.

4. The electronic equipment as defined in claim 1, wherein said lateral recess is constituted by plural lateral recesses disposed for fingers of a hand to hold said housing manually.

5. The electronic equipment as defined in claim 1, wherein said side surface or said lateral recess has a curved surface portion in a thickness direction of said housing.

6. The electronic equipment as defined in claim 1, wherein said electrically conductive sheet is formed in a shape of said front surface and said right and left side surfaces by thermal processing, and then fitted on said housing.

7. A display control method for a display device disposed on a front surface of a housing, comprising steps of:
inputting contact information according to a rubbing movement in contact with a contact surface portion disposed on at least one side surface of said housing, by use of a touch sensor;
processing image sequence information including plural images of a predetermined sequence for forward or backward page turning of said images according to a direction of said rubbing movement, for display control of said display device according to said image sequence information being processed,
wherein said at least one side surface is right and left side surfaces and wherein said touch sensor is constituted by a right side touch sensor disposed in said right side surface and a left side touch sensor disposed in said left side surface;
the display control method further comprising steps of,
selecting a left-to-right direction or a right-to-left direction for page turning according to said contact information from said right and left side touch sensors; and
disabling one of said right and left side touch sensors from detecting contact according to a selection result of said selecting step,
wherein the housing includes a lateral recess formed in said at least one side surface, said contact surface portion and said touch sensor being disposed at said lateral recess;
wherein said contact surface portion includes a first contact area, and the electronic equipment includes a second contact area separate from said contact surface portion, said second contact area including an upper inclined surface and a lower inclined surface, said upper and lower inclined surfaces being separate from the first contact area and disposed on opposite sides of said first contact area,
wherein said information processing device, in case said first contact area is rubbed, processes said image sequence information in a mode for displaying said images by one image, and in case said second contact area is contacted, processes said image sequence information in a mode for simultaneously displaying a plurality of images among said images,
wherein said right and left side touch sensors are constituted by one electrically conductive sheet in a flexible form, and
wherein the contact surface portion includes touch bar devices that extend in a longitudinal direction, are arranged in a thickness direction, and are separated by a space therebetween.

8. The display control method as defined in claim 7, wherein assuming that said contact information is detected from one of said right and left side touch sensors, a remaining one of said right and left side touch sensors is disabled in said disabling step.

9. A non-transitory storage medium for storing a computer-executable program for electronic equipment including a display device disposed on a front surface of a housing, and a touch sensor for detecting contact with a contact surface portion disposed on at least one side surface of said housing, said computer-executable program comprising:
a program code for inputting contact information according to a rubbing movement in contact with said contact surface portion by use of said touch sensor;
a program code for processing image sequence information including plural images of a predetermined sequence for forward or backward page turning according to a direction of said rubbing movement, and for display control of said display device according to said image sequence information being processed,
wherein said at least one side surface is right and left side surfaces and wherein said touch sensor is constituted by a right side touch sensor disposed in said right side surface and a left side touch sensor disposed in said left side surface;
the computer-executable program further comprising, a program code for selecting a left-to-right direction or a right-to-left direction for page turning according to said contact information from said right and left side touch sensors; and
a program code for disabling one of said right and left side touch sensors from detecting contact according to a selection result of said selecting step, wherein the housing includes a lateral recess formed in said at least one side surface, said contact surface portion and said touch sensor being disposed at said lateral recess;

wherein said contact surface portion includes a first contact area, and the electronic equipment includes a second contact area separate from said contact surface portion, said second contact area including an upper inclined surface and a lower inclined surface, said upper and lower inclined surfaces being separate from the first contact area and disposed on opposite sides of said first contact area, wherein said information processing device, in case said first contact area is rubbed, processes said image sequence information in a mode for displaying said images by one image, and in case said second contact area is contacted, processes said image sequence information in a mode for simultaneously displaying a plurality of images among said images, wherein said right and left side touch sensors are constituted by one electrically conductive sheet in a flexible form, and wherein the contact surface portion includes touch bar devices that extend in a longitudinal direction, are arranged in a thickness direction, and are separated by a space therebetween.

* * * * *